United States Patent
Kataoka et al.

(10) Patent No.: US 10,320,579 B2
(45) Date of Patent: Jun. 11, 2019

(54) COMPUTER-READABLE RECORDING MEDIUM, INDEX GENERATING APPARATUS, INDEX GENERATING METHOD, COMPUTER-READABLE RECORDING MEDIUM, RETRIEVING APPARATUS, AND RETRIEVING METHOD

(71) Applicant: FUJITSU LIMITED, Kawasaki-shi, Kanagawa (JP)

(72) Inventors: Masahiro Kataoka, Kamakura (JP); Toshihiro Nishimura, Hachioji (JP); Yukari Hakamata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/711,587

(22) Filed: Sep. 21, 2017

(65) Prior Publication Data
US 2018/0102910 A1   Apr. 12, 2018

(30) Foreign Application Priority Data

Oct. 6, 2016   (JP) .................. 2016-198487

(51) Int. Cl.
| H04L 12/18 | (2006.01) |
| H04L 29/06 | (2006.01) |
| H04L 12/46 | (2006.01) |
| H04L 12/761 | (2013.01) |
| G06F 17/27 | (2006.01) |
| H04L 12/715 | (2013.01) |

(52) U.S. Cl.
CPC .......... *H04L 12/185* (2013.01); *G06F 17/277* (2013.01); *H04L 12/4645* (2013.01); *H04L 45/16* (2013.01); *H04L 63/065* (2013.01); *H04L 45/04* (2013.01); *H04L 63/104* (2013.01)

(58) Field of Classification Search
None
See application file for complete search history.

(56) References Cited

U.S. PATENT DOCUMENTS

| 6,658,405 | B1 * | 12/2003 | Ozbutun ............. G06F 16/2237 |
| 7,162,401 | B1 * | 1/2007 | Abeles ................ G06F 17/5022 703/13 |
| 8,793,290 | B1 * | 7/2014 | Pruthi ................... G06F 3/0604 707/821 |
| 2009/0193020 | A1 | 7/2009 | Kataoka et al. |
| 2012/0072434 | A1 | 3/2012 | Kataoka et al. |
| 2013/0013605 | A1 | 1/2013 | Stanfill |
| 2013/0013606 | A1 | 1/2013 | Stanfill |

(Continued)

FOREIGN PATENT DOCUMENTS

| JP | 3-19081 | 1/1991 |
| JP | 2014-524090 | 9/2014 |

(Continued)

*Primary Examiner* — Eunsook Choi
(74) *Attorney, Agent, or Firm* — Xsensus LLP

(57) ABSTRACT

An index generating apparatus acquires values corresponding to a plurality of respective attributes of a number that appears in a piece of target text data. The index generating apparatus then maps the values corresponding to the respective attributes to value ranges of the respective attributes. The index generating apparatus then generates a bitmap index indicating bitmap data in which a position at which the number appears is mapped to each of a plurality of value ranges.

6 Claims, 24 Drawing Sheets

(56) References Cited

U.S. PATENT DOCUMENTS

| | | | |
|---|---|---|---|
| 2014/0071900 A1* | 3/2014 | Park | H04W 74/04 370/329 |
| 2014/0156670 A1 | 6/2014 | Hosomi | |
| 2014/0258628 A1* | 9/2014 | Shivashankaraiah | G06F 12/0871 711/129 |

FOREIGN PATENT DOCUMENTS

| | | |
|---|---|---|
| WO | WO 2008/047432 A1 | 4/2008 |
| WO | WO 2012/176374 A1 | 12/2012 |
| WO | WO 2013/009622 A1 | 1/2013 |

* cited by examiner

COMPUTER-READABLE RECORDING MEDIUM, INDEX GENERATING APPARATUS, INDEX GENERATING METHOD, COMPUTER-READABLE RECORDING MEDIUM, RETRIEVING APPARATUS, AND RETRIEVING METHOD

CROSS-REFERENCE TO RELATED APPLICATION(S)

This application is based upon and claims the benefit of priority of the prior Japanese Patent Application No. 2016-198487, filed on Oct. 6, 2016, the entire contents of which are incorporated herein by reference.

FIELD

The embodiments discussed herein are related to an index generating program and the like.

BACKGROUND

Known is a technology for retrieving a number to be retrieved, using a bitmap index representing a set of bit sequences indicating, for each file to be retrieved, whether the number is present in a group of numbers with the number of significant digits and the most significant digit matching those of the number to be retrieved (for example, see International Publication Pamphlet No. WO2008/047432).

For such a technology, an information processing apparatus is caused to detect the number of significant digits and the most significant digit of the number to be retrieved, and to extract a bit sequence indicating, for each file to be retrieved, whether the number is present in a group of numbers with the number of significant digits and the most significant digit matching those having been detected, using a bitmap index. The information processing apparatus then identifies a file to be retrieved that is mapped to a bit included in the extracted bit sequence and indicating the presence of the number, from a plurality of files to be retrieved. The information processing apparatus then refers to the identified file to be retrieved, and determines whether the number to be retrieved is present.

SUMMARY

According to an aspect of an embodiment, a non-transitory computer-readable recording medium has stored therein a program. The program causes a computer to execute an index generating process. The process includes acquiring values corresponding to a plurality of respective attributes of a number appearing in a piece of target text data. The process includes mapping the values corresponding to the respective attributes to value ranges of the respective attributes. The process includes generating index information indicating bitmap data in which a position at which the number appears is mapped to each of a plurality of value ranges.

According to another aspect of an embodiment, a non-transitory computer-readable recording medium has stored therein a program. The program causes a computer to execute a retrieving process. The process includes receiving a predetermined condition for retrieving a number. The process includes converting the received condition for retrieving the number into conditions corresponding to a plurality of value ranges of a plurality of respective attributes of the number. The process includes retrieving the converted conditions using index information indicating bitmap data in which a position at which the number appears is mapped to each of the value ranges of the respective attributes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A conventional technology is incapable of generating index information with which a number can be retrieved without making any entity reference, while suppressing an increase in size, at the same time. In other words, the bitmap index used in the conventional technology is index information representing a set of bit sequences indicating, for each file to be retrieved, whether a number is present in a group of numbers with the number of significant digits and the most significant digit that match those of the number. Hence, when a number is to be retrieved, the information processing apparatus can narrow down the files to be retrieved into those including numbers belonging to the group of numbers with a matching number of significant digits and most significant digit as those of the number to be retrieved. The information processing apparatus, however, needs to refer to the actual files to be retrieved having been narrowed down, and to perform matching with the number to be retrieved. In other words, the information processing apparatus is incapable of generating index information with which a number can be retrieved without making any entity reference.

In order to make a number retrieval possible without making any entity reference, the information processing apparatus may generate index information by expressing a number using a decimal significand and exponent, for example, so that a piece of index information is assigned to the number. The information processing apparatus, however, still needs to refer to the actual data to retrieve the number when the significand includes a small number of digits, and the size of the index information is increased when the significand has an increased number of digits, disadvantageously.

These challenges need to be addressed, not only in retrievals of a number, but also in retrievals of a range of numbers, and comparisons between numbers.

Preferred embodiments of the present invention will be explained with reference to accompanying drawings. The embodiments are, however, not intended to limit the scope of the present invention in any way.

[a] First Embodiment

Example of Bitmap Index Generating Process According to First Embodiment

Figure 1:
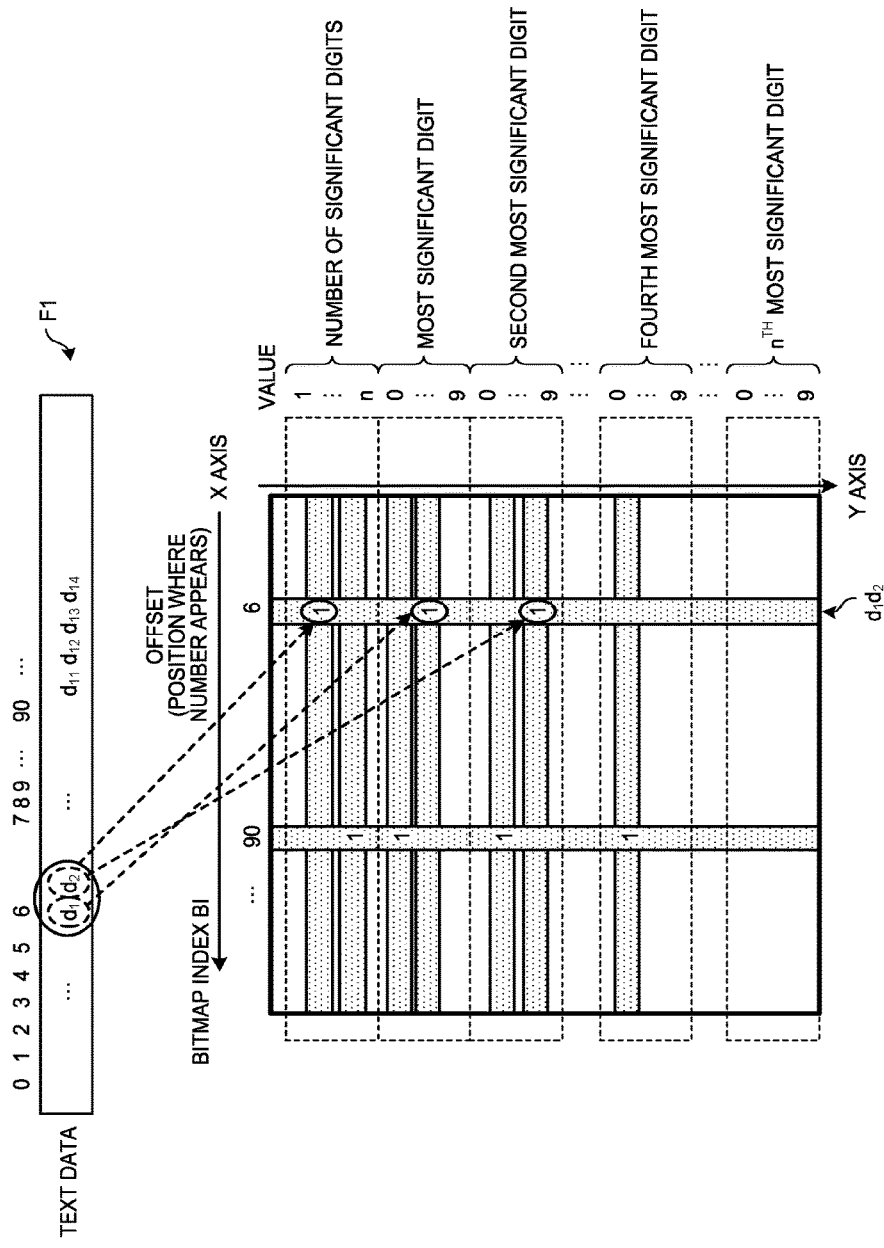
FIG. 1 is a schematic illustrating an example of the sequence of a bitmap index generating process according to a first embodiment of the present invention.

FIG. 1 is a schematic illustrating an example of the sequence of a bitmap index generating process according to a first embodiment. As illustrated in FIG. 1, text data F1 is a document including decimal numbers. The bitmap index generating process generates a bitmap index BI in which a set of value ranges are defined for a plurality of respective attributes of each of the numbers, such as the number of significant digits and the digit in each place of the number, and the position at which the number appears in the text data F1 is mapped to such a set of value ranges. Hereinafter, the bitmap index generating process will be referred to as an "index generating process".

The bitmap index BI is a set of bitmaps representing a set of value ranges defined for a plurality of respective attributes of a number, such as the number of significant digits and the digit in each place of the number. In other words, the bitmap index BI is bitmap index information of bitmaps in which the position at which a number appears in the target text data F1 is mapped to a plurality of value ranges, each including values to one of which the number is assigned. A number appearing at a position can be represented as a bitmap representing a collection of bits that are mapped to a plurality of value ranges corresponding to the position.

For example, the index generating apparatus reads the text data F1 from a memory area, and performs a lexical analysis of the read text data F1. The lexical analysis herein means dividing the text data F1 into units of words, characters, and numbers.

The index generating apparatus acquires the numbers resultant of the lexical analysis, one by one.

The index generating apparatus acquires the number of significant digits and the digit in each place from the acquired number. The index generating apparatus selects a bitmap corresponding to the number of significant digits in the number, from a set of bitmaps representing a value range of the number of significant digits. The index generating apparatus then sets the appeared bit to the bit at which the selected bitmap intersects with a bitmap corresponding to the position at which the number appears. The appeared bit is represented by "1" in the binary system, for example. The index generating apparatus then selects a bitmap corresponding to the $n^{th}$ most significant digit of the number, from a set of bitmaps representing a value range of the $n^{th}$ most significant digit. The index generating apparatus then sets the appeared bit to the bit at which the selected bitmap intersects with the bitmap corresponding to the position at which the number appears.

As illustrated in FIG. 1, it is assumed herein that the number is "$d_1d_2$". $d_1d_2$ is a decimal number with two significant digits. The index generating apparatus acquires "2" as the number of significant digits in the number. The index generating apparatus then acquires "$d_1$" as the most significant digit, and "$d_2$" as the second most significant digit.

The index generating apparatus selects the bitmap corresponding to the number of significant digits in the number, which is "2", from a set of bitmaps representing a value range of the number of significant digits. The index generating apparatus then sets "1" to the bit at which the selected bitmap intersects with the bitmap corresponding to the position at which the number appears. The index generating apparatus then selects the bitmap corresponding to the most significant digit of the number, which is "$d_1$", from a set of bitmaps corresponding to a value range of the most significant digit. The index generating apparatus sets "1" to the bit at which the selected bitmap intersects with the bitmap corresponding to the position at which the number appears. The index generating apparatus also selects the bitmap corresponding to the second most significant digit of the number, which is "$d_2$", from a set of bitmaps representing a value range of the second most significant digit. The index generating apparatus then sets "1" to the bit at which the selected bitmap intersects with the bitmap corresponding to the position at which the number appears.

Example of Bitmap Index

Figure 2:
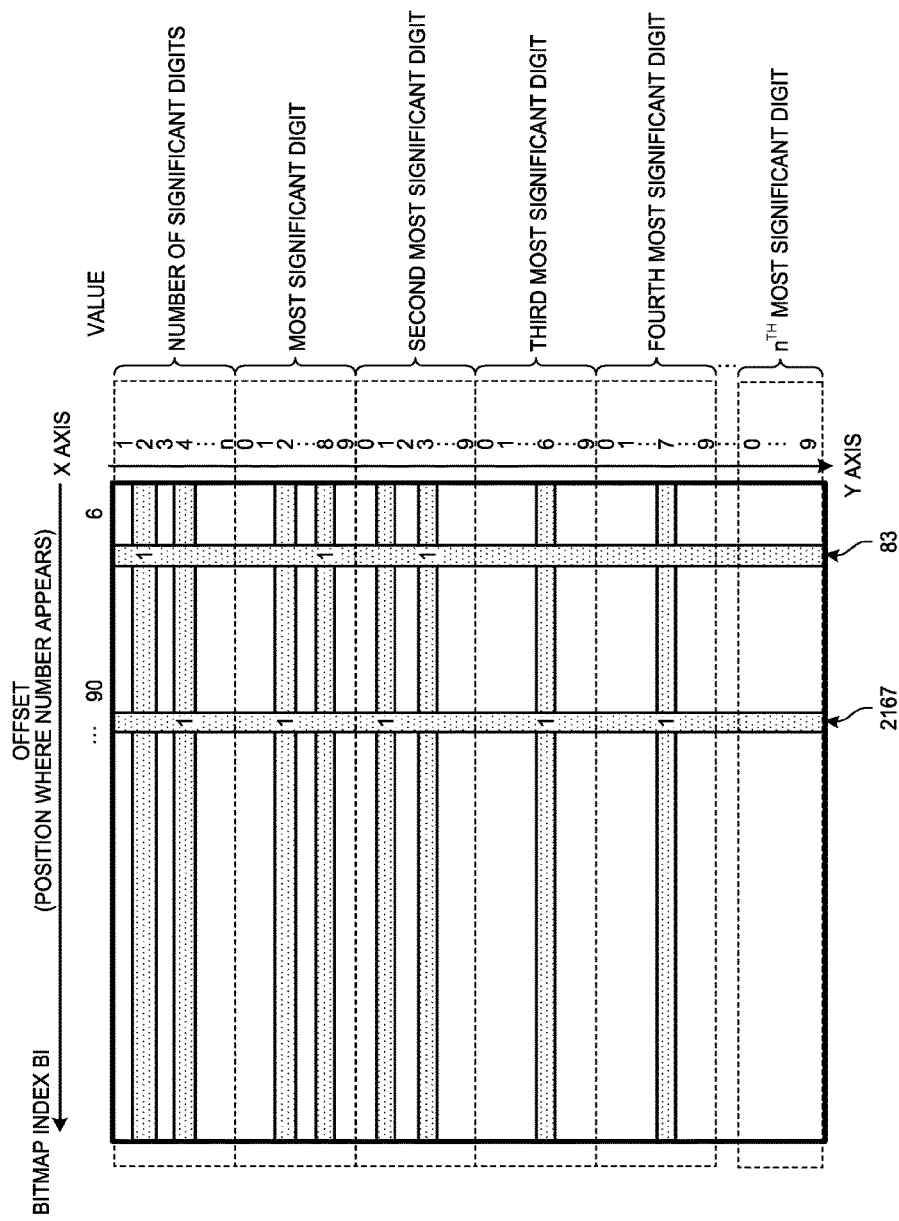
FIG. 2 is a schematic illustrating an example of a bitmap index according to the first embodiment.

An example of the bitmap index BI according to the first embodiment will now be explained with reference to FIG. 2. FIG. 2 is a schematic illustrating an example of the bitmap index according to the first embodiment. As illustrated in FIG. 2, the bitmap index BI has an X axis representing the offset (position), and a Y axis representing the number. The bitmap index BI maps a set of bitmaps to a plurality of respective ranges of the number of significant digits, and of the $n^{th}$ most significant digit in the number. n herein is a number that is equal to the greatest value of the number of significant digits. As an example, n is a natural number equal to or greater than five.

The offset (position) indicated by the X axis indicates the position at which the number appears in the text data F1. The text data F1 may be data consisting of only one file, or data consisting of a plurality of files. The text data F1 may be data consisting of only one block, or data consisting of a plurality of blocks. One bitmap is then assigned to each offset.

A number indicated by the Y axis can be expressed using the number of significant digits and the $n^{th}$ most significant digit. The number of significant digits represents a value range of the number of significant digits in the number. The value range of the number of significant digits is between 1 and n. A most significant digit represents a value range of the most significant digit of the number. The value range of the most significant digit is between 0 and 9. A second most significant digit represents a value range of the second most significant digit of the number. The value range of the second most significant digit is between 0 and 9. A third most significant digit represents a value range of the third most significant digit in the number. The value range of the third most significant digit is between 0 and 9. A fourth most significant digit represents a value range of the fourth most significant digit of the number. The value range of the fourth most significant digit is between 0 and 9. An $n^{th}$ most significant digit represents a value range of the $n^{th}$ most significant digit in the number. The value range of the $n^{th}$ most significant digit is between 0 and 9.

A bitmap is then assigned to each value included in the value range of the number of significant digits. A bitmap is then assigned to each value (digit) within the value range of the most significant digit. A bitmap is then assigned to each value (digit) within the value range of the second most significant digit. A bitmap is then assigned to each value (digit) within the value range of the third most significant digit. A bitmap is then assigned to each value (digit) within the value range of the fourth most significant digit. A bitmap is assigned to each value (digit) within the value range of the $n^{th}$ most significant digit.

For example, the sixth column of the bitmap index BI represents a bitmap of a number "83" at an offset "6". "1" is set to the bit position of "2" for number of significant digits. "1" is set to the bit position of "8" for the most significant digit. "1" is set to the bit position of "3" for second most significant digit.

The 90th column of the bitmap index BI represents a bitmap of a number "2167" at an offset "90". "1" is set to the bit position of "4" for number of significant digits. "1" is set to the bit position of "2" for the most significant digit. "1" is set to the bit position of "1" for second most significant digit. "1" is set to the bit position of "6" for third most significant digit. "1" is set to the bit position of "7" for fourth most significant digit.

In this manner, the index generating apparatus generates the bitmap index BI that is bitmap index information in which a position at which a number appears is mapped to the number of significant digits and each of a plurality of value ranges.

Example of Number Retrieving Process

Figure 3:
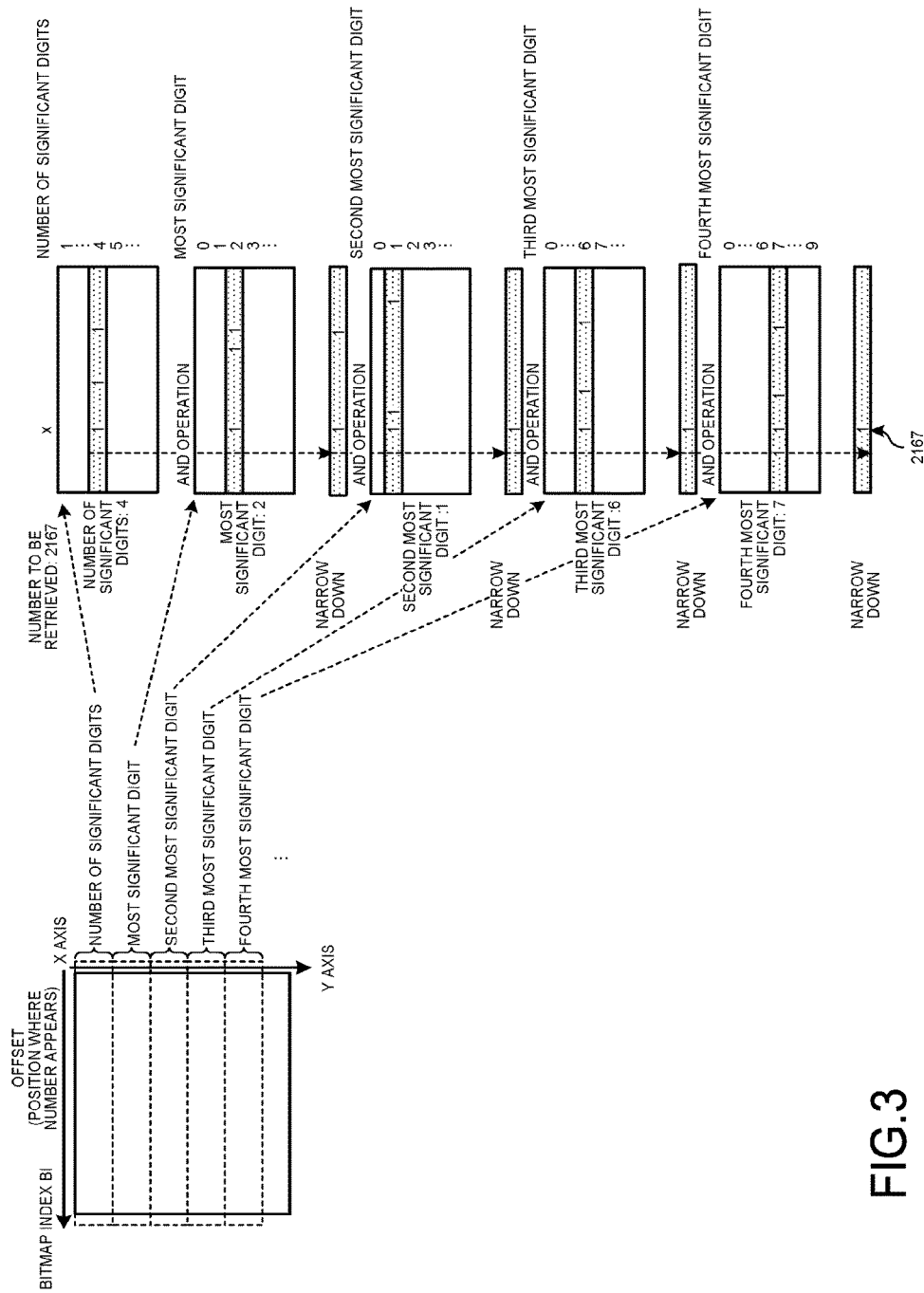
FIG. 3 is a schematic illustrating an example of the sequence of a number retrieving process according to the first embodiment.

FIG. 3 is a schematic illustrating an example of the sequence of a number retrieving process according to the first embodiment. As illustrated in FIG. 3, the number retrieving process divides the value range corresponding to each attribute of the number, based on a condition that is a retrieval query for retrieving a number or a range of numbers, and narrows down the retrieval results by combining the bitmaps of a plurality of respective attributes. In other words, the number retrieving process receives a condition for retrieving a number, and converts the received condition for retrieving the number into conditions using a plurality of value ranges that are mapped to a plurality of respective attributes of the number. The number retrieving process then retrieves the conditions resulted from the conversion, using each of the value ranges, from the bitmap index BI.

For example, the retrieving apparatus receives a condition for retrieving a number. The retrieving apparatus then acquires the number of significant digits and the digit in each place of the number specified in the received condition. The retrieving apparatus then converts the received condition for retrieving the number, into conditions using the acquired number of significant digits and the acquired digit in each place.

The retrieving apparatus then narrows down the position at which the number to be retrieved appears, using the bitmap corresponding to the number of significant digits specified in the conditions resulted from the conversion. As an example, the retrieving apparatus identifies the number of significant digits specified in the conditions resulted from the conversion, from the value range of the number of significant digits. The retrieving apparatus then acquires the bitmap corresponding to the identified number of significant digits from the bitmap index BI. As a result, the retrieving apparatus can narrow down the results to those matching the number of significant digits.

The retrieving apparatus then narrows down the position of the number to be retrieved, using the bitmap corresponding to the most significant digit specified in the conditions resulted from the conversion. As an example, the retrieving apparatus identifies the most significant digit specified in the conditions resulted from the conversion, from the value range of the most significant digit. The retrieving apparatus acquires the bitmap corresponding to the identified most significant digit from the bitmap index BI. The retrieving apparatus then performs an AND operation of the results having been immediately previously narrowing down with the number of significant digits, and the results having just been narrowing down with the most significant digit. As a result, the retrieving apparatus can narrow down the results to those matching the number of significant digits and matching the most significant digit.

If there is any unprocessed place in the conditions resulted from the conversion, the retrieving apparatus then keeps narrowing down the positions of the number to be retrieved, using the bitmap corresponding to the digit in the unprocessed place, until there is no unprocessed place any longer. As an example, the retrieving apparatus selects an unprocessed place from the conditions resulted from the conversion. The retrieving apparatus identifies the digit in the selected place from the value range of the selected place. The retrieving apparatus then acquires the bitmap corresponding to the identified digit in the corresponding place from the bitmap index BI. The retrieving apparatus then performs an AND operation of the results having been immediately previously narrowed down with the digit in the corresponding place, and the results having just been narrowed down with the digit in the current place. As a result, the retrieving apparatus can narrow down the results to those matching the number of significant digits and matching the numbers in a plurality of respective places.

It is assumed that, as illustrated in FIG. 3, the number to be retrieved indicated in the condition for the number retrieval is "2167". "2167" is a decimal number with four significant digits. The retrieving apparatus acquires, for the number to be retrieved, "4" as the number of significant digits. The retrieving apparatus then acquires, for the number to be retrieved, "2" as the most significant digit, "1" as the second most significant digit, "6" as the third most significant digit, and "7" as the fourth most significant digit. The retrieving apparatus then converts the condition specifying the number to be retrieved into a condition having "4" as the number of significant digits, a condition having "2" as the most significant digit, a condition having "1" as the second most significant digit, a condition having "6" as the third most significant digit, and having "7" as the fourth most significant digit.

The retrieving apparatus then identifies the number of significant digits, "4", specified in the conditions resulted from the conversion, from the value range of the number of significant digits. The retrieving apparatus acquires the bitmap corresponding to the identified number of significant digits, which is "4", from the bitmap index BI. As a result, the retrieving apparatus can narrow down the results to those matching the significant digits, which is "4".

The retrieving apparatus identifies the most significant digit "2" specified in the conditions resulted from the conversion, from the value range of the most significant digit. The retrieving apparatus then acquires the bitmap corresponding to the identified most significant digit, which is "2", from the bitmap index BI. The retrieving apparatus then performs an AND operation of the results having been immediately previously narrowed down with the number of significant digits "4" and the results having been just narrowed down with the most significant digit "2". As a result, the retrieving apparatus can narrow down the results to those matching the significant digits, which is "4" and matching the most significant digit "2".

The retrieving apparatus then identifies the second most significant digit "1" specified in the conditions resulted from the conversion, from the value range of the second most significant digit. The retrieving apparatus then acquires the bitmap corresponding to the identified second most significant digit "1", from the bitmap index BI. The retrieving apparatus then performs an AND operation of the results having been immediately previously narrowed down with the most significant digit "2" and the results having been just narrowed down with the second most significant digit "1". As a result, the retrieving apparatus can narrow down the results to those matching the number of significant digits "4", matching the most significant digit "2", and matching the second most significant digit "1".

The retrieving apparatus then identifies the third most significant digit "6" specified in the conditions resulted from the conversion, from the value range of the third most significant digit. The retrieving apparatus then acquires the bitmap corresponding to the identified third most significant digit "6", from the bitmap index BI. The retrieving apparatus then performs an AND operation of the results having been immediately previously narrowed down with the second most significant digit "1" and the results having been just narrowed down with the third most significant digit "6". As a result, the retrieving apparatus can narrow down the results to those matching the number of significant digits "4", matching the most significant digit "2", matching the second most significant digit "1", and matching the third most significant digit "6".

The retrieving apparatus then identifies the fourth most significant digit "7" specified in the conditions resulted from the conversion, from the value range of the fourth most significant digit. The retrieving apparatus then acquires the bitmap corresponding to the identified fourth most significant digit "7", from the bitmap index BI. The retrieving apparatus then performs an AND operation of the results having been immediately previously narrowed down with the third most significant digit "6" and the results having been just narrowed down with the fourth most significant digit "7". As a result, the retrieving apparatus can narrow down the results to those matching the number of significant digits "4", matching the most significant digit "2", matching the second most significant digit "1", matching the third most significant digit "6", and matching the fourth most significant digit "7".

As a result, the retrieving apparatus can narrow down the result into the position x matching the number of significant digits "4", matching the most significant digit "2", matching the second most significant digit "1", matching the third most significant digit "6", and matching the fourth most significant digit "7". In other words, the retrieving apparatus finds "x" as the position at which "2167", which is the number to be retrieved specified in the condition for the number retrieval, appears.

In this manner, the retrieving apparatus retrieves the position at which the number to be retrieved appears, using the bitmap corresponding to the digit in each place of the number to be retrieved. As a result, the number retrieving process can speed up a number retrieval by retrieving the number without making a reference to the text data F1 that is the actual data.

Example of Range Retrieving Process

Figure 4:
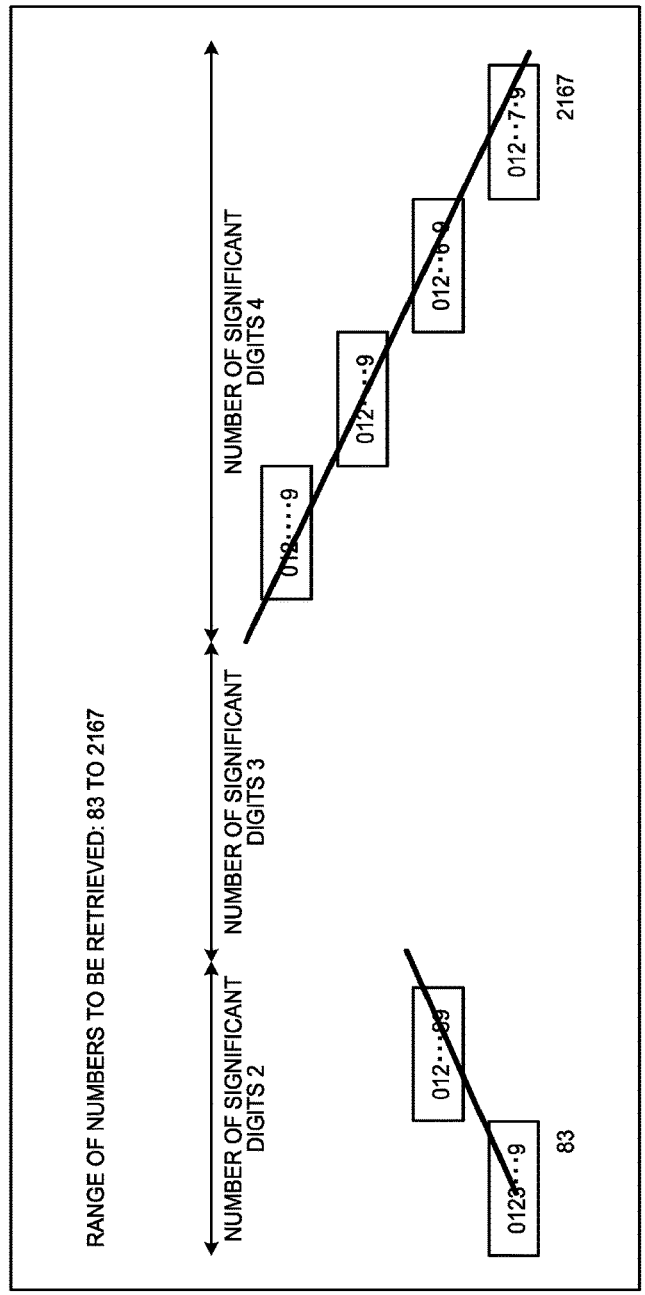
FIG. 4 is a schematic illustrating an example of a range retrieving process according to the first embodiment.

FIG. 4 is a schematic illustrating an example of a range retrieving process according to the first embodiment. As illustrated in FIG. 4, the range retrieving process receives a condition for retrieving a range of numbers, and divides the received condition for retrieving the range, into conditions specified in units of the number of significant digits.

For example, it is assumed that the range to be retrieved, specified in the condition for retrieving a range of numbers, is "83 to 2167". "83" at the lower bound is a decimal number with two significant digits. "2167" at the upper bound is a decimal number with four significant digits. The range retrieving process then divides this condition specifying the range to be retrieved into a condition for retrieving a range "83 to 99" having two significant digits, a condition for retrieving a range "100 to 999" having three significant digits, and a condition for retrieving a range "1000 to 2167" having four significant digits.

Figure 5A:
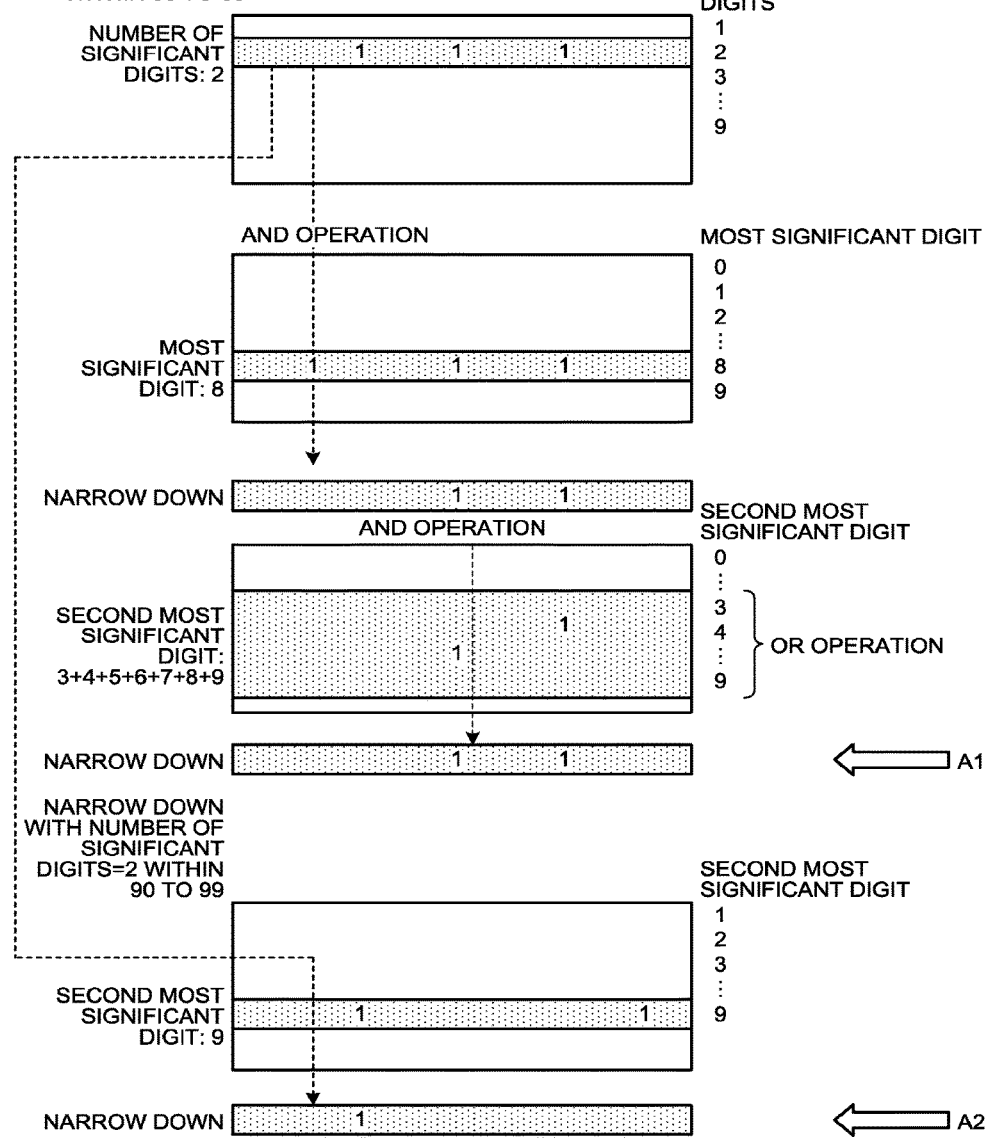
FIG. 5A is a first schematic illustrating an example of the sequence of the range retrieving process according to the first embodiment.
Figure 5B:
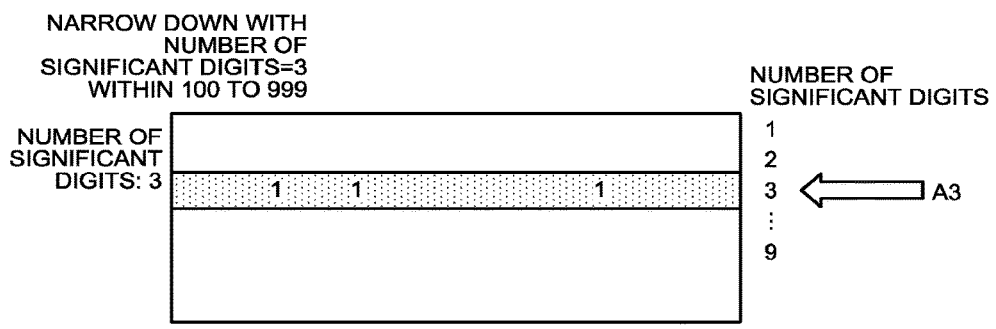
FIG. 5B is a second schematic illustrating an example of the sequence of the range retrieving process according to the first embodiment.
Figure 5C:
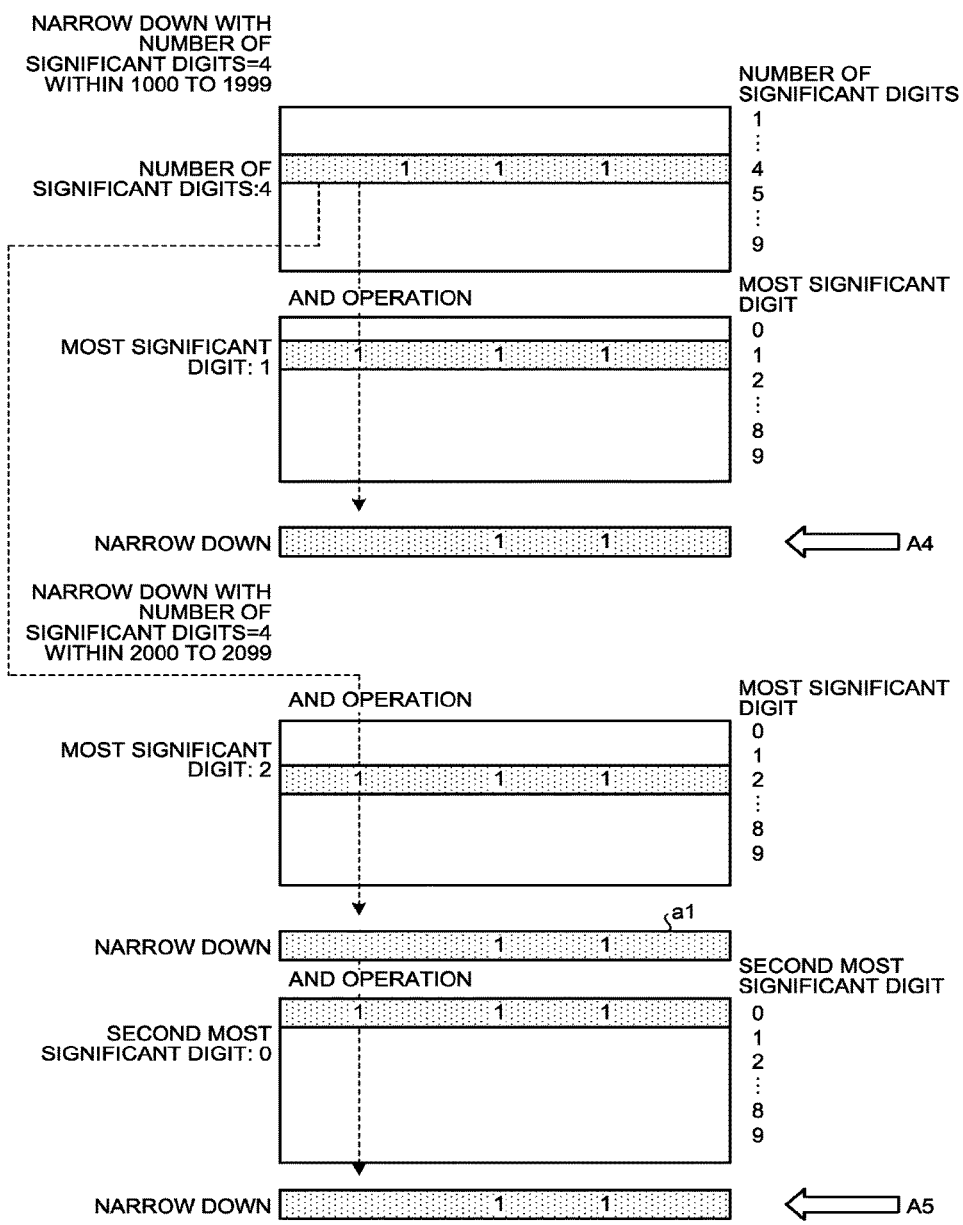
FIG. 5C is a third schematic illustrating an example of the sequence of the range retrieving process according to the first embodiment.
Figure 5D:
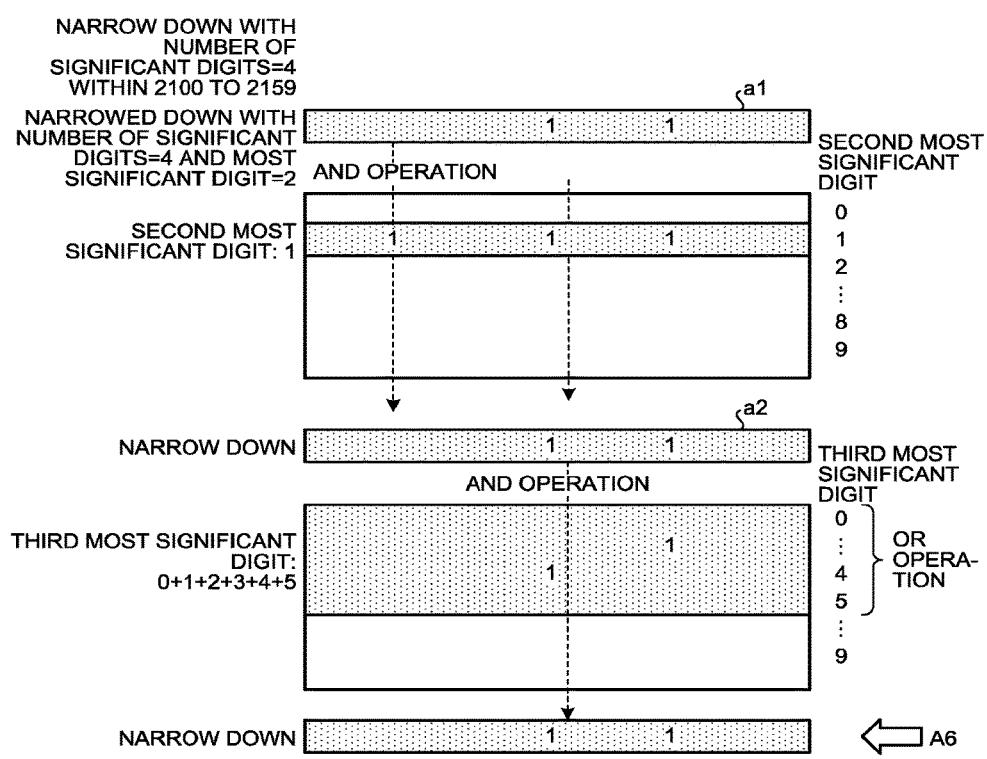
FIG. 5D is a fourth schematic illustrating an example of the sequence of the range retrieving process according to the first embodiment.
Figure 5E:
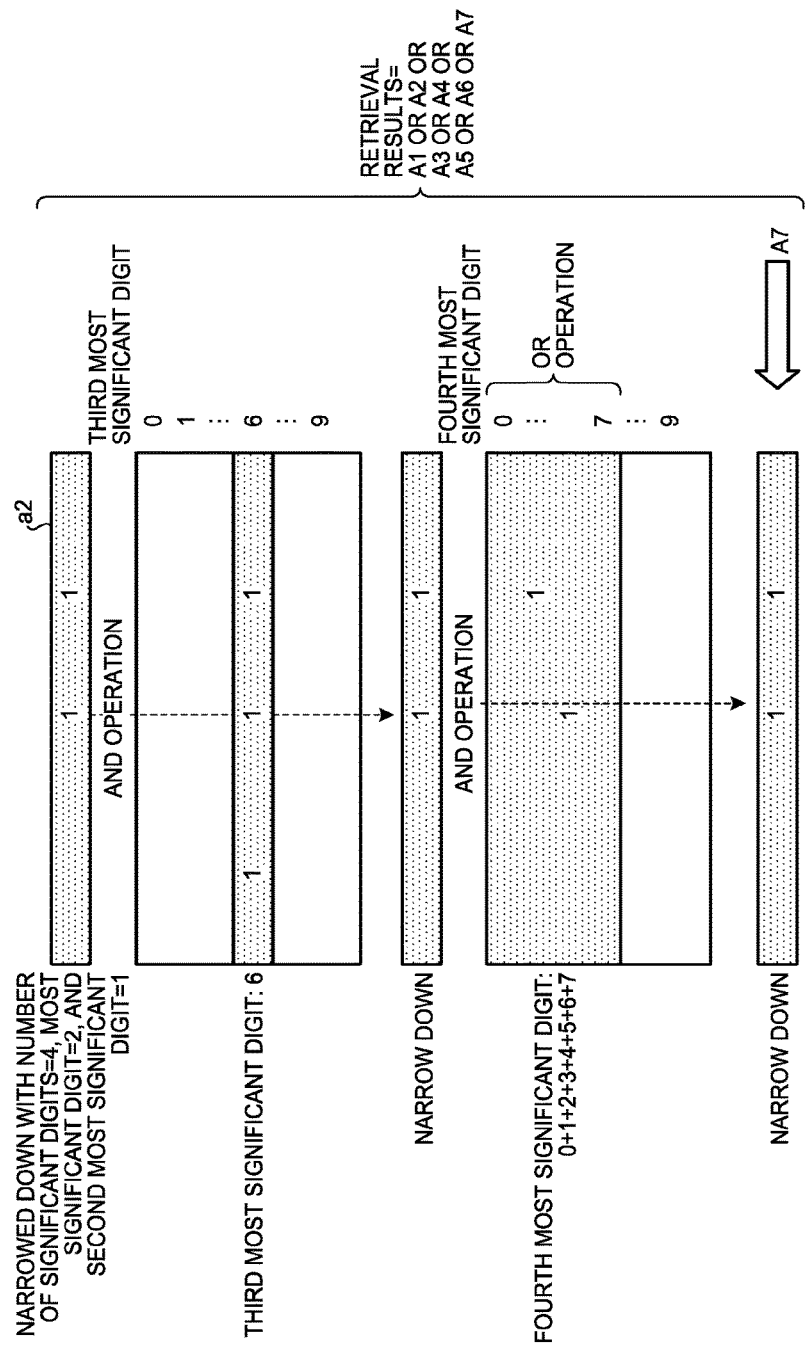
FIG. 5E is a fifth schematic illustrating an example of the sequence of the range retrieving process according to the first embodiment.

FIGS. 5A to 5E are schematics illustrating an example of the sequence of a range retrieving process according to the first embodiment. In FIGS. 5A to 5E, it is assumed that the range to be retrieved specified in the condition for retrieving a range of numbers is "83 to 2167". FIG. 5A is a schematic for explaining the process of retrieving a range with a condition "83 to 99" having two significant digits. FIG. 5B is a schematic for explaining the process of retrieving a range with a condition "100 to 999" having three significant digits. FIGS. 5C to 5E are schematics for explaining the range retrieving process with a condition "1000 to 2167" having four significant digits. As illustrated in FIGS. 5A to 5E, the range retrieving process converts the retrieval condition specifying the number of significant digits in the number at the lower bound into conditions corresponding to a plurality of value ranges of a plurality of respective attributes of the numbers, using the numbers within the retrieval range. The number retrieving process then retrieves the conditions resulted from the conversion, using each of the value ranges included in the bitmap index BI. In addition, if the range retrieving process finds any number of significant digits in between the number of significant digits in the lower-bound number and that in the upper-bound number, using the numbers at the upper bound number and the lower bound specified in a range retrieval condition, the range retrieving process adds another condition corresponding to the value range of the number of significant digits. The number retrieving process then retrieves with the added condition, using the value range of the number of significant digits, from the bitmap index BI. In addition, the range retrieving process converts the retrieval range condition specifying the number of significant digits in the number at the upper bound, into conditions corresponding to ranges of a plurality of respective attributes of the number, using the numbers within the range to be retrieved. The number retrieving process then retrieves with the conditions resulted from the conversion, using the respective value ranges, from the bitmap index BI.

As illustrated in FIG. 5A, the range retrieving process with the condition "83 to 99", in which the number of significant digits is 2, is performed using "83 to 89" and "90 to 99".

The range retrieving process using the retrieval range "83 to 89", in which the number of significant digits is 2, is performed in the manner described below. The retrieving apparatus performing the range retrieving process acquires, for the number "83" at the lower bound of the retrieval range, "2" as the number of significant digits. The retrieving apparatus then acquires, for the numbers within the retrieval range, "8" as the most significant digit. The retrieving apparatus then acquires "3 to 9" as the second most significant digit of the numbers within the retrieval range.

The retrieving apparatus identifies the number of significant digits "2" from the value range of the number of significant digits. The retrieving apparatus then acquires the bitmap corresponding to the identified number of significant digits, which is "2", from the bitmap index BI. As a result, the retrieving apparatus can narrow down the results to those matching the significant number of digits "2".

The retrieving apparatus identifies the most significant digit "8" from the value range of the most significant digit. The retrieving apparatus then acquires the bitmap corresponding to the identified most significant digit "8" from the bitmap index BI. The retrieving apparatus then performs an AND operation of the results having been immediately previously narrowed down with the number of significant digits "2" and the results having been just narrowed down with the most significant digit "8". As a result, the retrieving apparatus can narrow down the results to those matching the number of significant digits "2" and matching the most significant digit "8".

The retrieving apparatus identifies the second most significant digits "3" to "9" from the value range of the second most significant digit. The retrieving apparatus acquires the bitmaps corresponding to the identified second most significant digits "3" to "9" from the bitmap index BI. The retrieving apparatus then performs an OR operation of the acquired bitmaps corresponding to the numbers "3" to "9". The retrieving apparatus then performs an AND operation of the results having been immediately previously narrowed down with the most significant digit "8", and the results of the operation with the second most significant digits "3" to "9", having just been performed. As a result, the retrieving apparatus can narrow down the results to those matching the number of significant digits "2", matching the most significant digit "8", and matching the second most significant digits "3" to "9". These narrowed-down results correspond to the results having been narrowed down with the retrieval range "83 to 89", and are herein denoted as A1.

The range retrieving process using the retrieval range "90 to 99", in which the number of significant digits is 2, is performed in the manner described below. The retrieving apparatus acquires, for the numbers within the retrieval range, "9" as the most significant digit.

The retrieving apparatus then identifies the most significant digit "9" from the value range of the most significant digit. The retrieving apparatus then acquires the bitmap corresponding to the identified most significant digit "9" from the bitmap index BI. The retrieving apparatus then performs an AND operation of the already acquired bitmap corresponding to the number of significant digits "2", and the bitmap having been just acquired, corresponding to the most significant digit "9". As a result, the retrieving apparatus can narrow down the results to those matching the number of significant digits "2", and matching the most significant digit "9". These narrowed-down results correspond to the results having been narrowed down with the retrieval range "90 to 99", and are herein denoted as A2.

As illustrated in FIG. 5B, the range retrieving process with the condition "100 to 999", in which the number of significant digits is 3, is performed in the manner described below. The retrieving apparatus acquires, for the numbers within the retrieval range, "3" as the number of significant digits. The retrieving apparatus then identifies "3" from the value range of the number of significant digits. The retrieving apparatus acquires the bitmap corresponding to the identified number of significant digits, which is "3", from the bitmap index BI. As a result, the retrieving apparatus can narrow down the results to those matching the number of significant digits "3". These narrowed-down results correspond to the results having been narrowed down with the retrieval range "100 to 999", and are herein denoted as A3.

As illustrated in FIGS. 5C to 5E, the range retrieving process with the condition "1000 to 2167", in which the number of significant digits is four, is performed using "1000 to 1999", "2000 to 2099", "2100 to 2159", and "2160 to 2167".

As illustrated in FIG. 5C, the range retrieving process using the retrieval range "1000 to 1999", in which the number of significant digits is four, is performed in the manner described below. The retrieving apparatus acquires, for the numbers within the retrieval range, "4" as the number of significant digits. The retrieving apparatus then acquires, for the numbers within the retrieval range, "1" as the most significant digit.

The retrieving apparatus then identifies the number of significant digits "4" from the value range of the number of significant digits. The retrieving apparatus then acquires the bitmap corresponding to the identified number of significant digits, which is "4", from the bitmap index BI. As a result, the retrieving apparatus can narrow down the results to those matching the number of significant digits "4".

The retrieving apparatus identifies the most significant digit "1" from the value range of the most significant digit. The retrieving apparatus then acquires the bitmap corresponding to the identified most significant digit "1" from the bitmap index BI. The retrieving apparatus then performs an AND operation of the results having been immediately previously narrowed down with the number of significant digits "4" and the results having been just narrowed down with the most significant digit "1". As a result, the retrieving apparatus can narrow down the results to those matching the number of significant digits "4", and matching the most significant digit "1". These narrowed-down results correspond to the results having been narrowed down with the retrieval range "1000 to 1999", and are herein denoted as A4.

The range retrieving process using the retrieval range "2000 to 2099", in which the number of significant digits is four, is performed in the manner described below. The retrieving apparatus acquires, for the numbers within the retrieval range, "2" as the most significant digit. The retrieving apparatus then acquires, for the numbers within the retrieval range, "0" as the second most significant digit.

The retrieving apparatus identifies the most significant digit "2", from the value range of the most significant digit. The retrieving apparatus then acquires the bitmap corresponding to the identified most significant digit "2", from the bitmap index BI. The retrieving apparatus then performs an AND operation of the bitmap corresponding to the number of significant digits "4" having been already acquired, and the bitmap corresponding to the most significant digit "2", having been just acquired. As a result, the retrieving apparatus can narrow down the results to those matching the number of significant digits "4", and matching the most significant digit "2".

The retrieving apparatus then identifies the second most significant digit "0" from the value range of the second most significant digit. The retrieving apparatus then acquires the bitmap corresponding to the identified second most significant digit "0" from the bitmap index BI. The retrieving apparatus then performs an AND operation of the results having been immediately previously narrowed down with "2" in the most significant digit, and the results having been just narrowed down with the second most significant digit "0". As a result, the retrieving apparatus can narrow down the results to those matching the number of significant digits "4", matching the most significant digit "2", and matching the second most significant digit "0". These narrowed-down results correspond to the results having been narrowed down for the retrieval range "2000 to 2099", and are herein denoted as A5.

As illustrated in FIG. 5D, the range retrieving process using the retrieval range "2100 to 2159", in which the number of significant digits is four, is performed in the manner described below. The retrieving apparatus acquires, for the numbers within the retrieval range, "1" as the second most significant digit. The retrieving apparatus acquires, for the numbers within the retrieval range, "0 to 5", as the third most significant digit.

The retrieving apparatus then identifies the second most significant digit "1" from the value range of the second most significant digit. The retrieving apparatus then acquires the bitmap corresponding to the identified second most significant digit "1" from the bitmap index BI. The retrieving apparatus then performs an AND operation of the result having been already narrowed down with the number of significant digits "4" and with the most significant digit "2", and the bitmap corresponding to the second most significant digit "1", having been just acquired. As a result, the retrieving apparatus can narrow down the results to those matching the number of significant digits "4", matching the most significant digit "2", and matching the second most significant digit "1".

The retrieving apparatus then identifies the third most significant digits "0" to "5" from the value range of the third most significant digit. The retrieving apparatus acquires the bitmaps corresponding to the identified third most significant digits "0" to "5" from the bitmap index BI. The retrieving apparatus then performs an OR operation of the bitmaps corresponding to the acquired digits "0" to "5". The retrieving apparatus then performs an AND operation of the results having been immediately previously narrowed down with the second most significant digit "1", with the result of the operation with the third most significant digits "0" to "5", having been just performed. As a result, the retrieving apparatus can narrow down the results to those matching the number of significant digits "4", matching the most significant digit "2", matching the second most significant digit "1", and matching the third most significant digits "0" to "5". These narrowed-down results correspond to the results having been narrowed down with the retrieval range "2100 to 2159", and are herein denoted as A6.

As illustrated in FIG. 5E, the range retrieving process using the retrieval range "2160 to 2167", in which the number of significant digits is four, is performed in the manner described below. The retrieving apparatus acquires, for the numbers within the retrieval range, "6" as the third most significant digit. The retrieving apparatus acquires, for the numbers within the retrieval range, "0 to 7", as the fourth most significant digits.

The retrieving apparatus identifies the third most significant digit "6" from the value range of the third most significant digit. The retrieving apparatus acquires the bitmap corresponding to the identified third most significant digit "6" from the bitmap index BI. The retrieving apparatus then performs an AND operation of the result having already been narrowed down with the number of significant digits "4", the most significant digit "2", and the second most significant digit "1", and the bitmap corresponding to "6" in the third most significant digit, having been just acquired. As a result, the retrieving apparatus can narrow down the results to those matching the number of significant digits "4", the most significant digit "2", the second most significant digit "1", and third most significant digit "6".

The retrieving apparatus then identifies the fourth most significant digits "0" to "7" from the value range of the fourth most significant digit. The retrieving apparatus acquires the bitmaps corresponding to the identified fourth most significant digits "0" to "7", from the bitmap index BI. The retrieving apparatus then performs an OR operation of the bitmaps corresponding to the acquired digits "0" to "7". The retrieving apparatus then performs an AND operation of the results having been immediately previously narrowed down with third most significant digit "6", and the result of the operation with the fourth most significant digits "0" to "7", having been just performed. As a result, the retrieving apparatus can narrow down the results to those matching the number of significant digits "4", the most significant digit "2", the second most significant digit "1", the third most significant digit "6", and the fourth most significant digits "0" to "7". These narrowed-down results correspond to the results having been narrowed down with the retrieval range "2160 to 2167", and are herein denoted as A7.

The retrieving apparatus then takes a logical sum of the entire narrowed-down results. In other words, the retrieving apparatus performs an OR operation of the narrowed-down results A1 to A7. The result of this operation is the retrieval result when the range to be retrieved is "83 to 2167".

In this manner, the retrieving apparatus retrieves the positions at which the numbers within the range to be retrieved appear, using bitmaps corresponding to the digit in each place of the numbers to be retrieved. As a result, the retrieving apparatus can speed up the retrieval of a range of numbers by retrieving the range without making a reference to the text data F1 that is the actual data.

Configuration of Index Generating Apparatus

Figure 6:
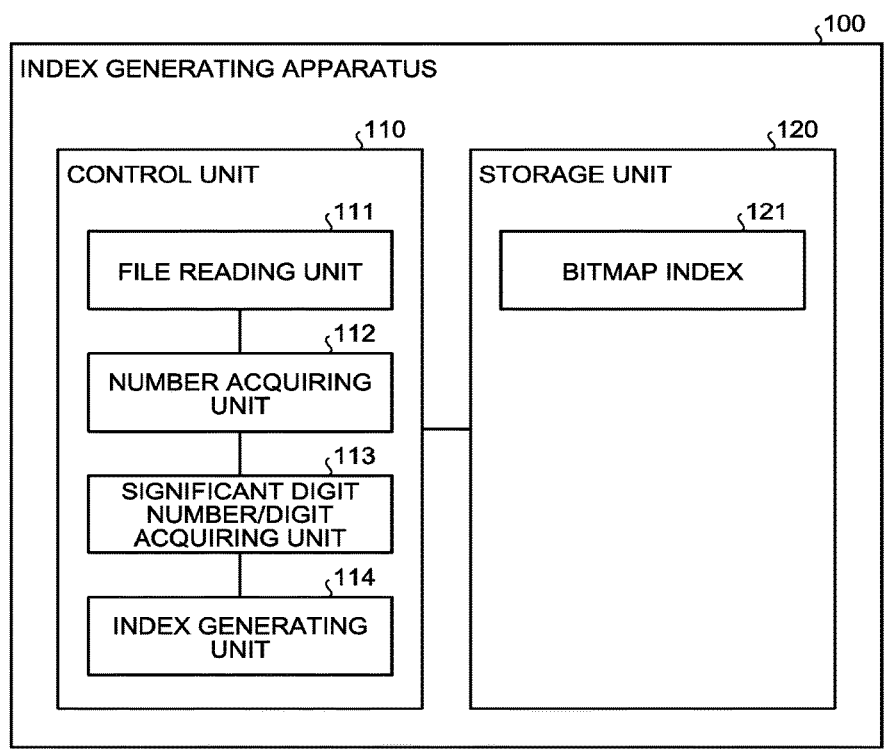
FIG. 6 is a block diagram illustrating an example of a functional configuration of an index generating apparatus according to the first embodiment.

FIG. 6 is a block diagram illustrating an example of a functional configuration of the index generating apparatus according to the first embodiment. As illustrated in FIG. 6, the index generating apparatus 100 includes a control unit 110 and a storage unit 120.

The control unit 110 is a processing unit that performs the process of generating the bitmap index BI illustrated in FIG. 1. The control unit 110 includes a file reading unit 111, a number acquiring unit 112, a significant digit number/digit acquiring unit 113, and an index generating unit 114.

The storage unit 120 corresponds to a storage device such as non-volatile semiconductor memory device, examples of which include a flash memory and a ferroelectric random-access memory (FRAM) (registered trademark). The storage unit 120 includes a bitmap index 121.

The bitmap index 121 is a set of bitmaps in which a position at which a number appears in the target text data F1 is mapped to each of a plurality of value ranges, each including values to one of which the number is assigned. The bitmap index 121 corresponds to the bitmap index BI. The bitmap index 121 is the same as that illustrated in FIG. 2, so that the explanations thereof are omitted herein.

The file reading unit 111 reads a file to be retrieved onto a memory area.

The number acquiring unit 112 reads the text data F1 from the memory area, and performs a lexical analysis of the read text data F1. The number acquiring unit 112 acquires the numbers resultant of the lexical analysis from the head of the text data F1, one by one. The number acquiring unit 112 outputs the acquired number, in a manner mapped to the position at which the number appears in the text data F1, to the significant digit number/digit acquiring unit 113.

The significant digit number/digit acquiring unit 113 acquires the number of significant digits and the digit in each place, in each of the numbers output from the number acquiring unit 112. The significant digit number/digit acquiring unit 113 outputs the number, the position at which the number appears, and the number of significant digits and the digit in each place of the number to the index generating unit 114, in a manner mapped to one another.

The index generating unit 114 generates the bitmap index 121. For example, the index generating unit 114 receives an input of the information in which the number, the position at which the number appears, and the number of significant digits and the digit in each place of the number are mapped to one another, from the significant digit number/digit acquiring unit 113. The index generating unit 114 then selects the bitmap corresponding to the number of significant digits in the number, included in the received information, from a set of bitmaps representing a value range of the number of significant digits. The index generating unit 114 then writes the appeared bit to the bit at which the selected bitmap intersects with the bitmap corresponding to the position at which the number appears. The index generating unit 114 then selects the bitmap corresponding to the $n^{th}$ most significant digit in the number, specified in the received information, from a set of bitmaps representing a value range of the $n^{th}$ most significant digit. The index generating unit 114 then writes the appeared bit to the bit at which the selected bitmap intersects with the bitmap corresponding to the position at which the number appears. "n" herein corresponds to a place of the number, specified in the received information. When the place is specified in the received information in plurality, the index generating unit 114 performs these selecting process and writing process, for each of the specified places.

Flowchart of Index Generating Process

Figure 7:
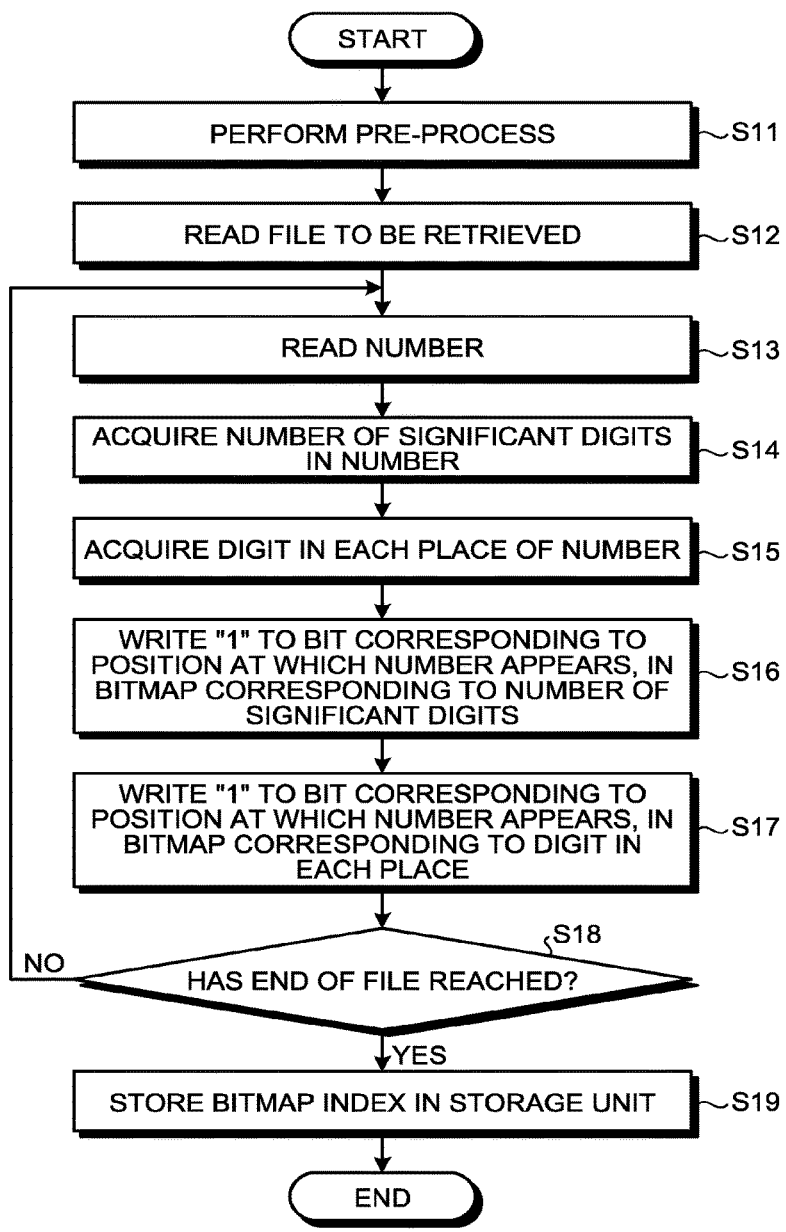
FIG. 7 is a schematic illustrating an example of a flowchart of an index generating process according to the first embodiment.

FIG. 7 is a schematic illustrating an example of a flowchart of the index generating process according to the first embodiment.

As illustrated in FIG. 7, the control unit 110 performs a pre-process (Step S11). For example, the control unit 110 reserves various memory areas in the storage unit 120. The control unit 110 then reads the file to be retrieved, and stores the text data F1 in a memory area for reading (Step S12).

The control unit 110 then reads the numbers one by one from the head of the reading memory area (Step S13). For example, the control unit 110 performs a lexical analysis of the text data F1 stored in the memory area for reading, and reads the numbers one by one from the head.

The control unit 110 then acquires the number of significant digits of the read number (Step S14). The control unit 110 then acquires the digit in each place of the read number (Step S15).

The control unit 110 writes "1" to the bit corresponding to the position at which the number appears, in the bitmap corresponding to the acquired number of significant digits (Step S16). For example, the control unit 110 selects a bitmap corresponding to the acquired number of significant digits, from a set of bitmaps representing a value range of the number of significant digits. The control unit 110 writes "1" representing an appeared bit to the bit at which the selected bitmap intersects with the bitmap corresponding to the position at which the number appears.

The control unit 110 then writes "1" to the bit corresponding to the position at which the number appears, in the bitmap corresponding to the acquired digit in each place (Step S17). For example, if the number has two digits, the control unit 110 selects the bitmap corresponding to the most significant digit, from a set of bitmaps representing a value range of the most significant digit. The index generating unit 114 writes "1" representing the appeared bit, to the bit at which the selected bitmap intersects with the bitmap corresponding to the position at which the number appears. The control unit 110 then selects the bitmap corresponding to the second most significant digit, from a set of bitmaps representing a value range of the second most significant digit. The index generating unit 114 writes "1" representing the appeared bit to the bit at which the selected bitmap intersects with the bitmap corresponding to the position at which the number appears.

The control unit 110 determines whether the end of the file has been reached (Step S18). If the control unit 110 determines that the end of the file has not been reached (No at Step S18), the control unit 110 shifts the process to Step S13 to read the next number.

If the control unit 110 determines that the end of the file has been reached (Yes at Step S18), the control unit 110 stores the bitmap index 121 in the storage unit 120 (Step S19). The control unit 110 ends the index generating process.

Configuration of Retrieving Apparatus

Figure 8:
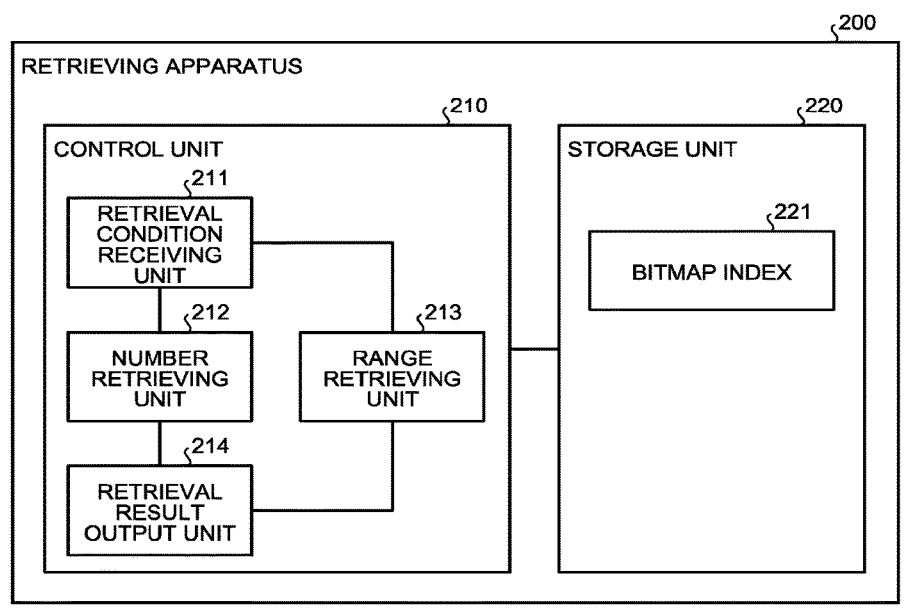
FIG. 8 is a block diagram illustrating an example of a functional configuration of a retrieving apparatus according to the first embodiment.

FIG. 8 is a block diagram illustrating an example of a functional configuration of the retrieving apparatus according to the first embodiment. As illustrated in FIG. 8, this retrieving apparatus 200 includes a control unit 210 and a storage unit 220.

The control unit 210 is a processing unit that performs the retrieving process illustrated in FIGS. 3 to 5E. The control unit 210 includes a retrieval condition receiving unit 211, a number retrieving unit 212, a range retrieving unit 213, and a retrieval result output unit 214.

The storage unit 220 corresponds to a storage device such as a non-volatile semiconductor memory device, examples of which include a flash memory and an FRAM (registered trademark). The storage unit 220 includes a bitmap index 221.

The bitmap index 221 is the same as that illustrated in FIG. 2, so that an explanation thereof is omitted herein.

The retrieval condition receiving unit 211 receives a retrieval condition. For example, the retrieval condition receiving unit 211 receives a number as a retrieval condition, and outputs the received number to the number retrieving unit 212. The retrieval condition receiving unit 211 also receives a range of numbers as a retrieval condition, and outputs the received range of numbers to the range retrieving unit 213. When the retrieval condition is a range of numbers, the retrieval condition specifies a number at the lower bound and a number at the upper bound.

When the retrieval condition is a number, the number retrieving unit 212 retrieves the number using the bitmap index 221.

For example, the number retrieving unit 212 converts the retrieval condition output from the retrieval condition receiving unit 211 into conditions corresponding to a value range of the number of significant digits, and a value range of the digit in each place of the number specified in the retrieval condition. As an example, the number retrieving unit 212 acquires the number of significant digits and the digit in each place of the number output from the retrieval condition receiving unit 211. The number retrieving unit 212 converts the retrieval condition into conditions corresponding to a value range of the acquired number of significant digits and a value range of the acquired digit in each place.

The number retrieving unit 212 then retrieves the conditions resulted from the conversion using each of the value ranges specified in the bitmap index 221. For example, the number retrieving unit 212 identifies the acquired number of significant digits, from the value range of the number of significant digits. The number retrieving unit 212 acquires the bitmap corresponding to the identified number of significant digits from the bitmap index 221. The number retrieving unit 212 identifies the acquired digit in each place, from the value range of the digit in the corresponding place, and acquires the bitmap corresponding to the identified digit in the corresponding place from the bitmap index 221. The number retrieving unit 212 then performs an AND operation of the bitmap corresponding to the acquired number of significant digits, and the bitmap corresponding to the digit in each place of the number. The number retrieving unit 212 outputs the bitmap resultant of the operation (narrowed-down result) to the retrieval result output unit 214. In other words, the number retrieving unit 212 retrieves the position at which the number specified in the retrieval condition appears.

When the retrieval condition specifies a range of numbers, the range retrieving unit 213 retrieves the range of numbers, using the bitmap index 221.

For example, the range retrieving unit 213 divides the retrieval condition output from the retrieval condition receiving unit 211 into a plurality of retrieval range conditions, in units of the number of significant digits. In other words, the range retrieving unit 213 divides the retrieval condition into a retrieval range condition for retrieving the range having the number of significant digits in the lower-bound number, a retrieval range condition for retrieving the range having the number of significant digits in the upper-bound number, and a retrieval range condition for retrieving the range having the number of significant digits in between the number of significant digits of the lower-bound number, and the number of significant digits of the upper-bound number.

The range retrieving unit 213 then converts the retrieval range condition specified with the number of significant digits in the lower-bound number, into a condition corresponding to a value range of the number of significant digits, and a condition corresponding to a value range of the digit in each place, using the numbers within the retrieval range. The range retrieving unit 213 then retrieves the conditions resulted from the conversion using the value ranges specified in the bitmap index 221.

The range retrieving unit 213 then converts the retrieval range condition specified with the number of significant digits in the upper-bound number, into a condition corresponding to a value range of the number of significant digits, and a condition corresponding a value range of the digit in each place, using the numbers within the retrieval range. The range retrieving unit 213 then retrieves the conditions resulted from the conversion using the value ranges specified in the bitmap index 221.

If there is any in-between number of significant digits, the range retrieving unit 213 converts the retrieval range condition specified with the in-between number of significant digits into a condition corresponding to a value range of the number of significant digits. The range retrieving unit 213 then retrieves the condition resultant of the conversion using the value range of the number of significant digits specified in the bitmap index 221.

The range retrieving unit 213 then takes a logical sum (OR) of the results having been retrieved in units of the number of significant digits. The range retrieving unit 213 then outputs the bitmap resultant of the operation (narrowed-down result) to the retrieval result output unit 214. In other words, the range retrieving unit 213 retrieves the position at which the range of numbers specified in the retrieval condition appears.

The retrieval result output unit 214 outputs the retrieval result. For example, the retrieval result output unit 214 determines whether the bitmap resultant of the retrieval output from the number retrieving unit 212 has any "1" indicating the appeared bit. If the bitmap has "1" indicating the appeared bit, the retrieval result output unit 214 outputs the position where "1" is found as the retrieval result. If there is no "1" indicating the appeared bit, the retrieval result output unit 214 outputs a retrieval result indicating that the target to be retrieved is not found.

Flowchart of Retrieving Process

Figure 9:
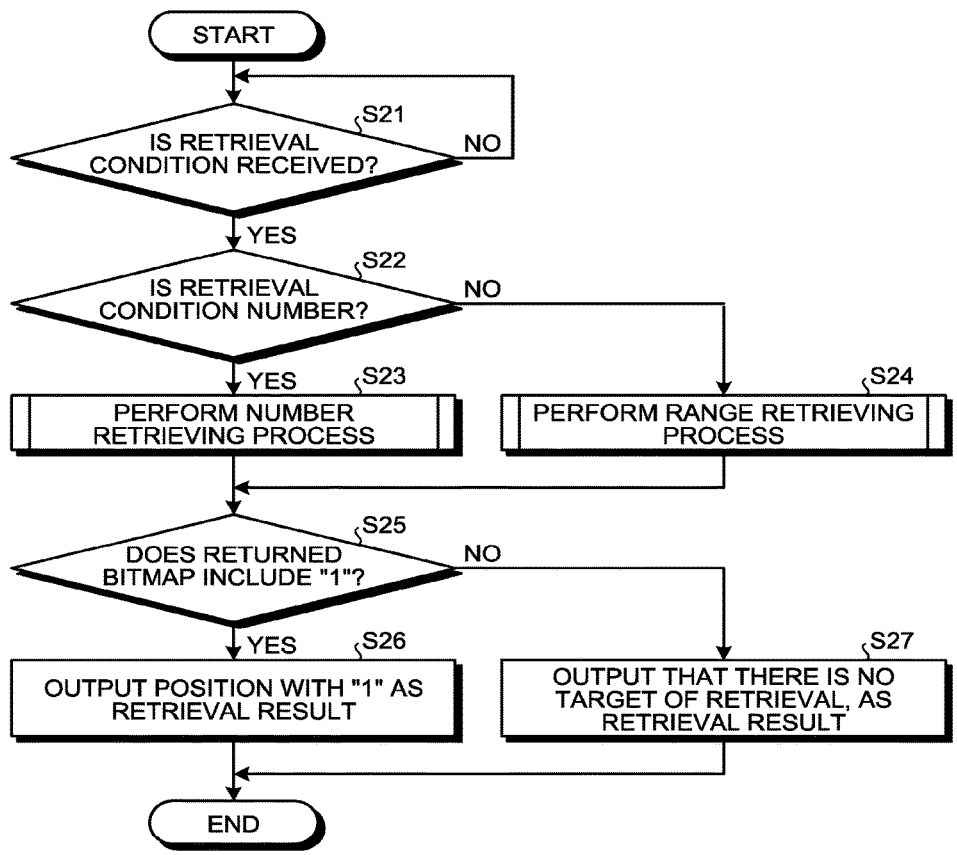
FIG. 9 is a schematic illustrating an example of a flowchart of a retrieving process according to the first embodiment.

FIG. 9 is a schematic illustrating an example of a flowchart of the retrieving process according to the first embodiment.

As illustrated in FIG. 9, the control unit 210 determines whether a retrieval condition has been received (Step S21). If no retrieval condition has been received (No at Step S21), the control unit 210 keeps making determining until a retrieval condition is received.

If the control unit 210 determines that a retrieval condition has been received (Yes at Step S21), the control unit 210 determines whether the retrieval condition specifies a number (Step S22). If the control unit 210 determines that the retrieval condition specifies a number (Yes at Step S22), the control unit 210 performs the number retrieving process (Step S23). The control unit 210 then shifts the process to Step S25. The flowchart of the number retrieving process will be described later.

If the control unit 210 determines that the retrieval condition does not specify a number (No at Step S22), the control unit 210 performs the range retrieving process (Step S24). The control unit 210 then shifts the process to Step S25. The flowchart of the range retrieving process will be described later.

At Step S25, the control unit 210 determines whether the returned bitmap has "1" (Step S25). If the control unit 210 determines that returned bitmap has "1" (Yes at Step S25), the control unit 210 outputs the position at which "1" is found as the retrieval result (Step S26). The control unit 210 then ends the retrieving process.

If the control unit 210 determines that returned bitmap has no "1" (No at Step S25), the control unit 210 outputs a retrieval result indicating that the target to be retrieved is not found (Step S27). The control unit 210 then ends the retrieving process.

Flowchart of Number Retrieving Process

Figure 10:
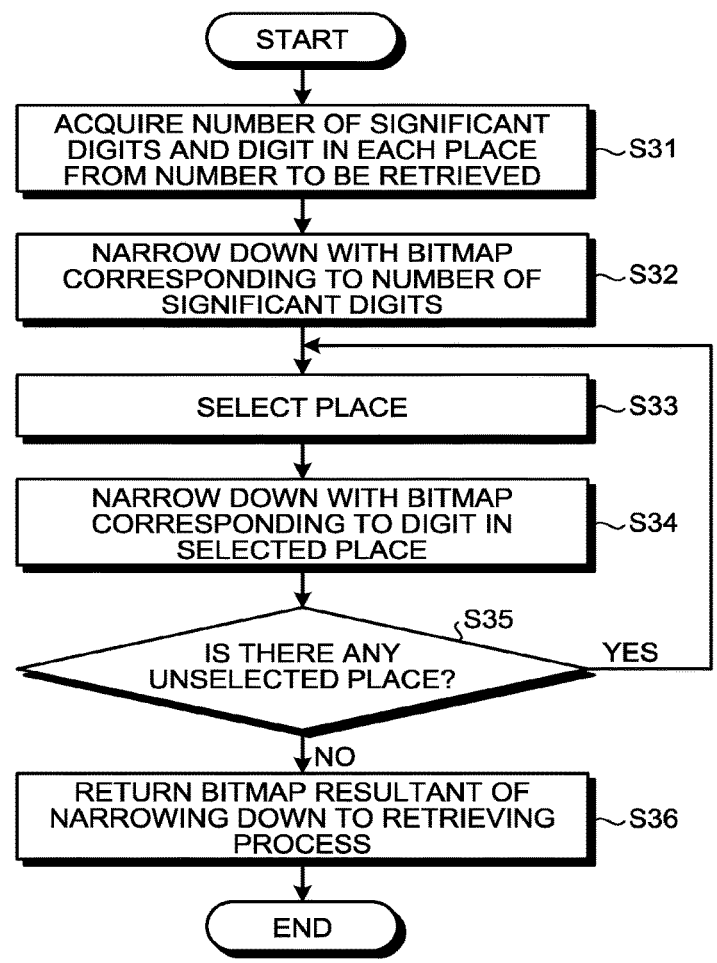
FIG. 10 is a schematic illustrating an example of a flowchart of the number retrieving process according to the first embodiment.

FIG. 10 is a schematic illustrating an example of a flowchart of the number retrieving process according to the first embodiment.

As illustrated in FIG. 10, the control unit 210 acquires the number of significant digits and the digit in each place of the number to be retrieved (Step S31). The control unit 210 narrows down the position at which the number appears using the bitmap corresponding to the acquired number of significant digits (Step S32). For example, the control unit 210 identifies the acquired number of significant digits from a value range of the number of significant digits. The control unit 210 then acquires the bitmap corresponding to the identified number of significant digits from the bitmap index 221. In other words, the control unit 210 narrows down the positions to those matching the number of significant digits.

The control unit 210 then selects a place of the number (Step S33). The control unit 210 narrows down the positions using the bitmap corresponding to the digit in the selected place (Step S34). For example, the control unit 210 acquires the bitmap corresponding to the digit in the selected place, from a value range of the digit in the selected place. In other words, the control unit 210 narrows down the positions to those matching the digit in the selected place. The control unit 210 then performs an AND operation of the results having been immediately previously narrow down with the attribute, and the result having been narrow down with the selected place. In other words, the control unit 210 narrows down the positions to those matching the immediately previous attribute and the selected attribute.

The control unit 210 then determines whether any place has not been selected yet (Step S35). If the control unit 210 determines that some place has not been selected yet (Yes at Step S35), the control unit 210 shifts the process to Step S33 to select the next place.

If the control unit 210 determines that no place has not been selected (No at Step S35), the control unit 210 returns the bitmap that is the narrowed-down result to the retrieving process (Step S36). The control unit 210 then ends the number retrieving process.

Flowchart of Range Retrieving Process

Figure 11:
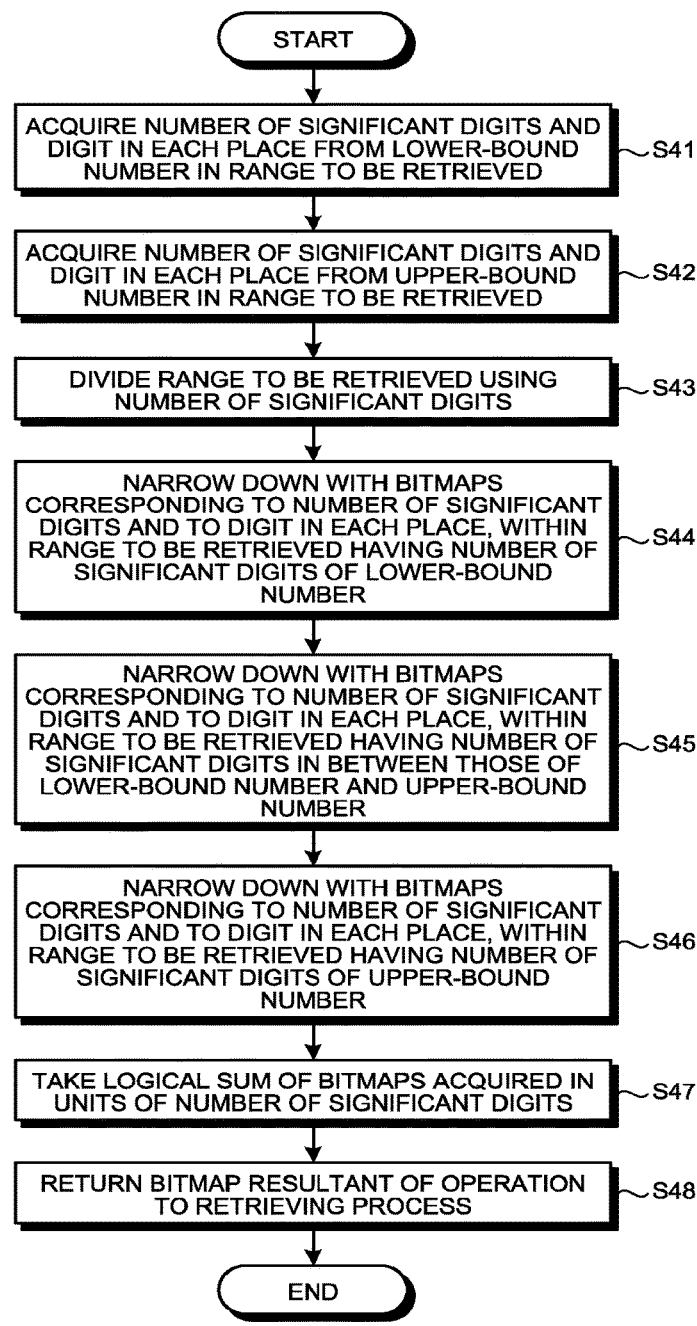
FIG. 11 is a schematic illustrating an example of a flowchart of the range retrieving process according to the first embodiment.

FIG. 11 is a schematic illustrating an example of a flowchart of the range retrieving process according to the first embodiment.

As illustrated in FIG. 11, the control unit 210 acquires the number of significant digits and the digit in each place in the lower-bound number of the range to be retrieved (Step S41). The control unit 210 then acquires the number of significant digits and the digit in each place in the upper-bound number of the range to be retrieved (Step S42).

The control unit 210 then divides the retrieval range using the numbers of significant digits (Step S43). In other words, the control unit 210 divides the range to be retrieved into a retrieval range having the same number of significant digits as that in the lower bound number, a retrieval range having the same number of significant digits as that in the upper bound number, and a retrieval range having the number of significant digits in between those in the lower bound number and the upper bound number.

The control unit 210 then narrows down the retrieval results using the bitmaps corresponding to the number of significant digits and the digit in each place, within the retrieval range having the same numbers of significant digits as that in the lower bound number (Step S44).

The control unit 210 then narrows down the retrieval results using a bitmap corresponding to the in-between number of significant digits, between the numbers of significant digits of the lower bound number and the upper bound number (Step S45).

The control unit 210 then narrows down the retrieval results using the bitmaps corresponding to the number of significant digits and the digit in each place, within the retrieval range having the same number of significant digits as that in the upper-bound number (Step S46).

The control unit 210 then takes a logical sum (OR) of the bitmaps acquired in units of the number of significant digits (Step S47). The control unit 210 then returns the bitmap resultant of the operation (narrowed-down result) to the retrieving process (Step S48). The control unit 210 then ends the range retrieving process.

Advantageous Effects Achieved by First Embodiment

According to the first embodiment described above, the index generating apparatus 100 acquires values corresponding to a plurality of respective attributes of a number that appears in the target text data F1, from the number. The index generating apparatus 100 then maps the values corresponding to the respective attributes to a plurality of value ranges of the respective attributes. The index generating apparatus 100 then generates the bitmap index 121 indicating bitmaps in which the position at which the number appears is mapped to each of a plurality of value ranges. With such a configuration, the index generating apparatus 100 can generate the bitmap index 121 with which a number can be retrieved without making any entity reference, while suppressing an increase in size.

Furthermore, according to the first embodiment described above, each of the value ranges is set based on the number of significant digits or the digit in each place, found in the conditions of past number retrievals in the text data F1, in the history of number retrievals. With such a configuration, when an index is to be generated, the index generating apparatus 100 can generate the bitmap index 121 with which a number can be retrieved, while suppressing an increase in size further.

Furthermore, according to the first embodiment described above, the retrieving apparatus 200 receives a predetermined condition for retrieving a number, and converts the received condition for retrieving the number into conditions corresponding to a plurality of value ranges of a plurality of respective attributes of the number. The retrieving apparatus 200 then retrieves the conditions resulted from the conversion, using the bitmap index 121. With such a configuration, the retrieving apparatus 200 can speed up the number retrievals without making any entity reference, by retrieving the number using the bitmap index 121.

Furthermore, according to the first embodiment described above, if the predetermined condition for retrieving a number is a condition specifying a range of numbers, the retrieving apparatus 200 divides the condition indicating the range of numbers into conditions in units of the number of significant digits. The retrieving apparatus 200 then performs the conversion process and the retrieving process for each of the divided conditions. With such a configuration, the retrieving apparatus 200 can speed up number range retrievals using the bitmap index 121, by dividing the condition using the number of significant digits, which is one of the attributes.

Furthermore, according to the first embodiment described above, the retrieving apparatus 200 responds with the result of the number retrieval by referring only to the bitmap index 121. With such a configuration, the retrieving apparatus 200 can retrieve a number without making an entity reference, so that a number retrieval can be sped up.

[b] Second Embodiment

Explained in the first embodiment is an example in which the index generating apparatus 100 generates the bitmap index BI, for decimal numbers. Furthermore, explained above is an example in which the retrieving apparatus 200 retrieves a decimal number, by referring to the bitmap index BI. The index generating apparatus 100 may also generate a bitmap index BI2 for binary numbers, without limitation to decimal numbers. The retrieving apparatus 200 may retrieve a binary number by referring to the bitmap index BI2, without limitation to a decimal number.

Therefore, explained in a second embodiment of the present invention is an example in which the index generating apparatus 100 generates the bitmap index BI2 for binary numbers. Explained below is an example in which the retrieving apparatus 200 retrieves a binary number, by referring to the bitmap index BI2.

Example of Bitmap Index Generating Process According to Second Embodiment

Figure 12:
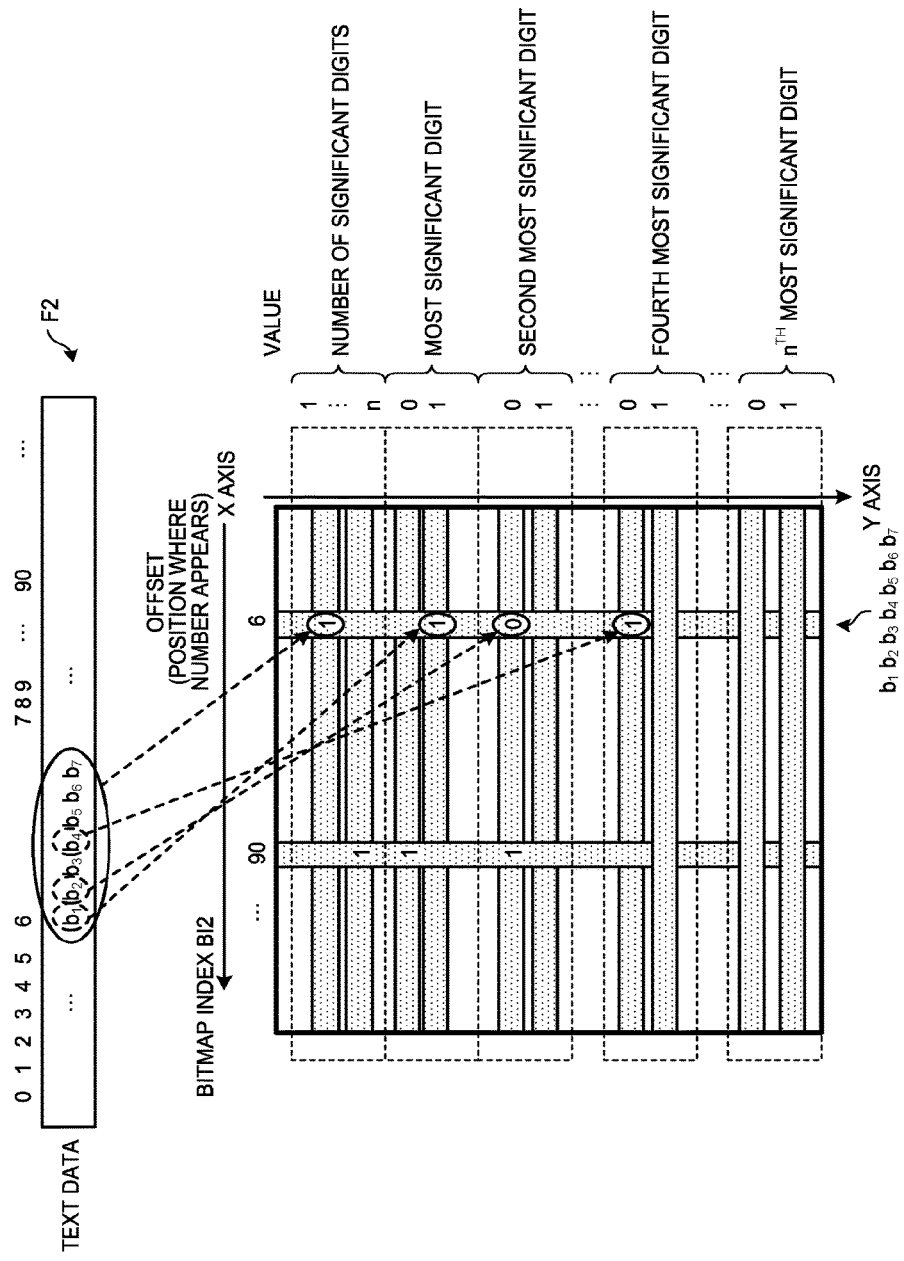
FIG. 12 is a schematic illustrating an example of the sequence of a bitmap index generating process according to a second embodiment of the present invention.

FIG. 12 is a schematic illustrating an example of the sequence of a bitmap index generating process according to the second embodiment. As illustrated in FIG. 12, text data F2 is a document including a binary number. The index generating apparatus 100 generates the bitmap index B12 in which a set of value ranges are defined for a plurality of respective attributes of each number, such as the number of significant digits and the digit in each place of the number, and the position at which the number appears in the text data F2 is mapped to such a set of value ranges.

The bitmap index BI2 is a set of bitmaps representing a collection of a plurality of value ranges defined for a plurality of respective attributes of a number, such as the number of significant digits and the digit in each place of the number. In other words, the bitmap index BI2 is index information in which the position at which a number appears in the target text data F2 is mapped to a plurality of value ranges, each including values to one of which the number is assigned. The value range of the digit in each place of the number only includes 0 and 1. A number appearing at a position can be represented as a bitmap corresponding to the position. The bitmap represents a set of bits in a plurality of respective value ranges.

As illustrated in FIG. 12, it is assumed that the number is "$b_1 b_2 b_3 b_4 b_5 b_6 b_7$". $b_1 b_2 b_3 b_4 b_5 b_6 b_7$ is a binary number with seven significant digits. The index generating apparatus 100 acquires "7" as the number of significant digits in the number. The index generating apparatus 100 acquires "$b_1$" as the most significant digit, "$b_2$" as the second most significant digit, "$b_3$" as the third most significant digit, "$b_4$" as the fourth most significant digit, "$b_5$" as the fifth most significant digit, "$b_6$" as the sixth most significant digit, and "$b_7$" as the seventh most significant digit.

The index generating apparatus 100 selects the bitmap corresponding to the number of significant digits in the number, which is "7", from a set of bitmaps representing a value range of the number of significant digits. The index generating apparatus 100 then sets "1" to the bit at which the selected bitmap intersects with the bitmap corresponding to the position at which the number appears. The index generating apparatus 100 also selects the bitmap corresponding to the most significant digit of the number "$b_1$", from the set of bitmaps corresponding to a value range of the most significant digit. The index generating apparatus 100 then sets "1" to the bit at which the selected bitmap intersects with the bitmap corresponding to the position at which the number appears. The index generating apparatus 100 selects the bitmap corresponding to the second most significant digit of the number, which is "$b_2$", from the set of bitmaps corresponding to a value range of the second most significant digit. The index generating apparatus 100 then sets "1" to the bit at which the selected bitmap intersects with the bitmap corresponding to the position at which the number appears. In the same manner, the index generating apparatus 100 sets "1" to the bitmap index BI2 for the third most significant digit "$b_3$", the fourth most significant digit "$b_4$", the fifth most significant digit "$b_5$", the sixth most significant digit "$b_6$", and the seventh most significant digit "$b_7$".

Example of Bitmap Index

Figure 13:
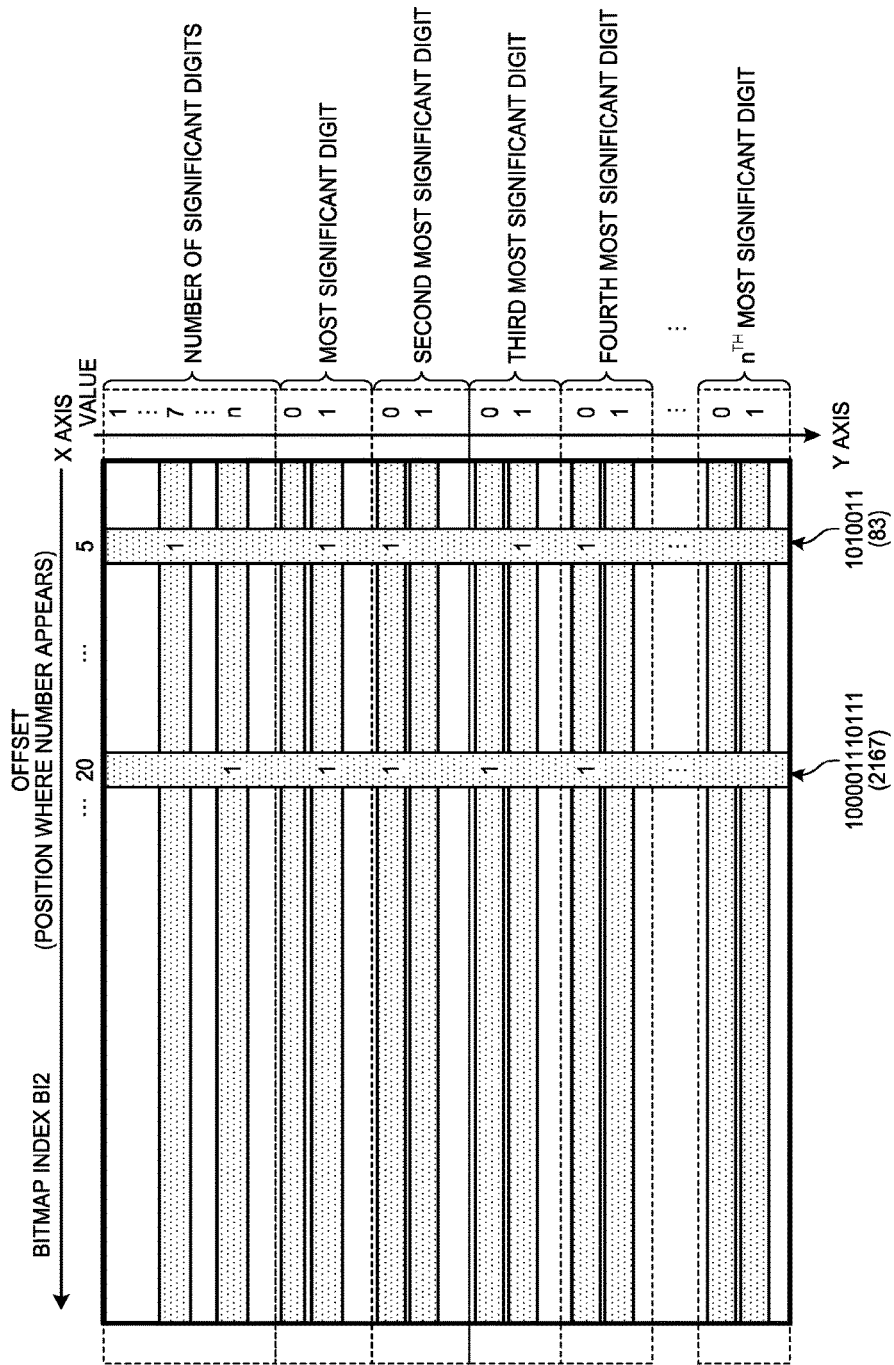
FIG. 13 is a schematic illustrating an example of a bitmap index according to the second embodiment.

An example of a bitmap index BI2 according to the second embodiment will now be explained with reference to FIG. 13. FIG. 13 is a schematic illustrating an example of the bitmap index according to the second embodiment. As illustrated in FIG. 13, the bitmap index BI2 has an X axis representing offset (position), and a Y axis representing the number. The bitmap index BI2 maps a set of bitmaps to a value range of the number of significant digits, and a value range of the $n^{th}$ most significant digit of the number. n herein is a number that is equal to the greatest value of the number of significant digits. n herein is a natural number equal to or greater than 12, as an example.

The offset (position) indicated by the X axis indicates the position at which the number appears in the text data F2. The text data F2 may be data consisting of only one file, or data consisting of a plurality of files. The text data F2 may be data consisting of only one block, or data consisting of a plurality of blocks. One bitmap is then assigned to each offset.

A number indicated by the Y axis can be expressed using the number of significant digits and the $n^{th}$ most significant digit. The number of significant digits represents a value range of the number of significant digits in the number. The value range of the number of significant digits is between 1 to n. A most significant digit represents a value range of the most significant digit of the number. The value range of the most significant digit is 0 and 1. A second most significant digit indicates the value range of the second most significant digit of the number. The value range of the second most significant digit is 0 and 1. The third most significant digit represents a value range of the third most significant digit of the number. The value range of the third most significant digit is 0 and 1. The fourth most significant digit represents a value range of the fourth most significant digit of the number. The value range of the fourth most significant digit is 0 and 1. The $n^{th}$ most significant digit represents a value range of the $n^{th}$ most significant digit of the number. The range of the $n^{th}$ most significant digit is 0 and 1.

A bitmap is then assigned to each value included in the range of the number of significant digits. A bitmap is assigned to each value (digit) within the value range of the most significant digit. A bitmap is assigned to each value (digit) within the value range of the second most significant digit. A bitmap is assigned to each value (digit) within the value range of the third most significant digit. A bitmap is assigned to each value (digit) within the value range of the fourth most significant digit. A bitmap is assigned to each value (digit) within the value range of the $n^{th}$ most significant digit.

For example, the fifth column in the bitmap index BI2 is a bitmap of a number "1010011" (83 in the decimal system) at an offset of "5". "1" is set to the bit position of "7" for number of significant digits. "1" is set to the bit position "1" for the most significant digit. "1" is set to the bit position of "0" for second most significant digit. "1" is set to the bit position of "1" for third most significant digit. "1" is set to the bit position of "0" for fourth most significant digit.

The twentieth column in the bitmap index BI2 is a bitmap of a number "100001110111" (2167 in the decimal system) at an offset of "20". "1" is set to the bit position of "12" for the number of significant digits. is set to the bit position "1" for the most significant digit. "1" is set to the bit position of "0" for the second most significant digit. "1" is set to the bit position of "0" for the third most significant digit. is set to the bit position of "0" for the fourth most significant digit.

In this manner, the index generating apparatus 100 generates the bitmap index BI2 that is bitmap index information in which a position at which a number appears is mapped to a value range of the number of significant digits and each of a plurality of value ranges of digit in respective places.

Example of Number Retrieving Process

Figure 14:
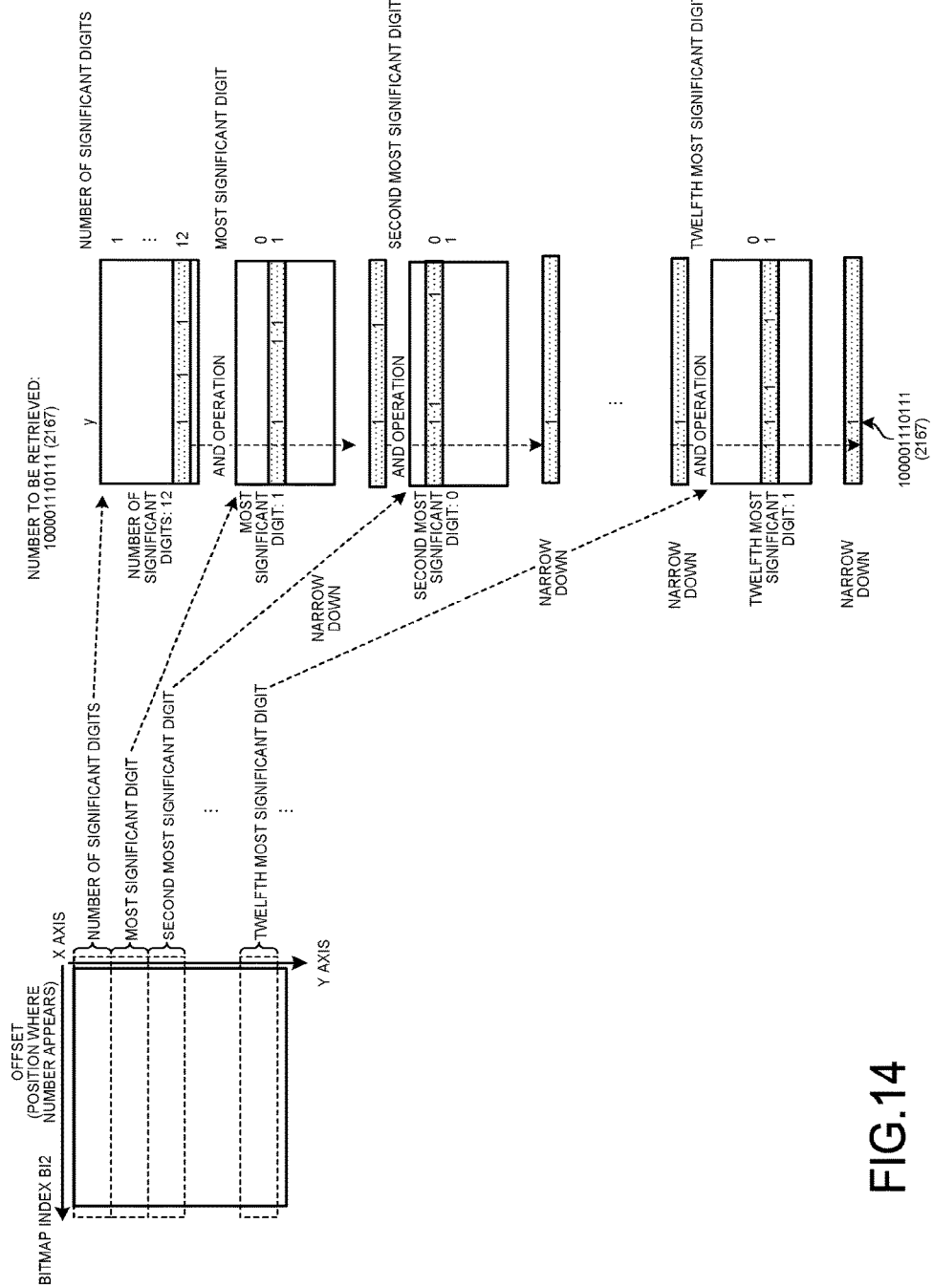
FIG. 14 is a schematic illustrating an example of the sequence of a number retrieving process according to the second embodiment.

FIG. 14 is a schematic illustrating an example of the sequence of a number retrieving process according to the second embodiment. As illustrated in FIG. 14, the retrieving apparatus 200 divides a condition that is a retrieval query for retrieving a number or a range of numbers into value ranges corresponding to a plurality of respective attributes of the number, and narrows down the results by combining the bitmaps corresponding to the respective attributes. In other words, the retrieving apparatus 200 receives a condition for retrieving a number, and converts the received condition for retrieving the number into conditions using a plurality of value ranges that are mapped to a plurality of respective attributes of the number. The retrieving apparatus 200 then retrieves the conditions resulted from the conversion using the respective value ranges specified in the bitmap index BI2.

As illustrated in FIG. 14, the number to be retrieved indicated in the condition for the number retrieval is "100001110111". "100001110111" (2167) is a binary number with 12 significant digits. The retrieving apparatus 200 acquires, for the number to be retrieved, "12" as the number of significant digits. The retrieving apparatus 200 acquires, for the number to be retrieved, "1" as the most significant digit, "0" as the second to the fifth most significant digits, "1" as the sixth to the eighth most significant digits, "0" as the ninth most significant digit, and "1" as the 10th to the 12th most significant digits. The retrieving apparatus 200 then converts the condition specifying the number to be retrieved into a condition using the acquired number of significant digits, and conditions using the acquired first to twelfth most significant digits.

The retrieving apparatus 200 then identifies the number of significant digits "12" specified in the conditions resulted from the conversion, from a value range of the number of significant digits. The retrieving apparatus 200 acquires the bitmap corresponding to the identified number of significant digits "12" from the bitmap index B12. As a result, the retrieving apparatus 200 can narrow down the results to those matching the number of significant digits "12".

The retrieving apparatus 200 identifies the most significant digit "1" specified in the conditions resulted from the conversion, from a value range of the most significant digit. The retrieving apparatus 200 acquires the bitmap corresponding to the identified most significant digit, which is "1", from the bitmap index B12. The retrieving apparatus 200 then performs an AND operation of the results having been immediately previously narrowed down with the number of significant digits "12" and the results having been just narrowed down with the most significant digit "1". As a result, the retrieving apparatus 200 can narrow down the results to those matching the number of significant digits "12", and matching the most significant digit "1".

The retrieving apparatus 200 identifies the second most significant digit "0" specified in the conditions resulted from the conversion, from a value range of the second most significant digit. The retrieving apparatus 200 acquires the bitmap corresponding to the identified second most significant digit, which is "0", from the bitmap index BI2. The retrieving apparatus 200 then performs an AND operation of the results having been immediately previously narrowed down with the most significant digit "1" and the results having been just narrowed down with the second most significant digit "0". As a result, the retrieving apparatus 200 can narrow down the results to those matching the number of significant digits "12", matching the most significant digit "1", and matching the second most significant digit "0".

In the same manner, the retrieving apparatus 200 performs an AND operation of results having been narrowed down with the digit in the immediately previous place, and the results having been narrowed down with the digit in the current place, using value ranges of the third to the eleventh most significant digits, respectively.

The retrieving apparatus 200 then identifies the 12th most significant digit "1" specified in the conditions resulted from the conversion, from a value range of the 12th most significant digit. The retrieving apparatus 200 acquires the bitmap corresponding to the identified 12th most significant digit, which is "1", from the bitmap index BI2. The retrieving apparatus 200 then performs an AND operation of the results having been immediately previously narrowed down with the eleventh most significant digit "1", and the result having been just narrowed down with the 12th most significant digit "1". As a result, the retrieving apparatus 200 can narrow down the results to those matching the number of significant digits, and matching the digits in the first to the twelfth most significant digits, respectively, in the number.

As a result, the retrieving apparatus 200 can narrow down the position y where the number to be retrieved appears, into a position having matches at the number of significant digits "12", the most significant digit "1", with the second most significant digit "0", the third most significant digit "0", . . . and the twelfth most significant digit "1". In other words, the retrieving apparatus 200 retrieves the position "y" at which "100001110111", which is the number to be retrieved, specified in the condition for the number retrieval, appears.

In this manner, the retrieving apparatus 200 retrieves the position at which the number to be retrieved appears, using a bitmap corresponding to the digit in each place of the number to be retrieved. As a result, the retrieving apparatus 200 can speed up the number retrieval by retrieving a number without making a reference to the text data F2 that is the actual data.

Example of Range Retrieving Process

Figure 15:
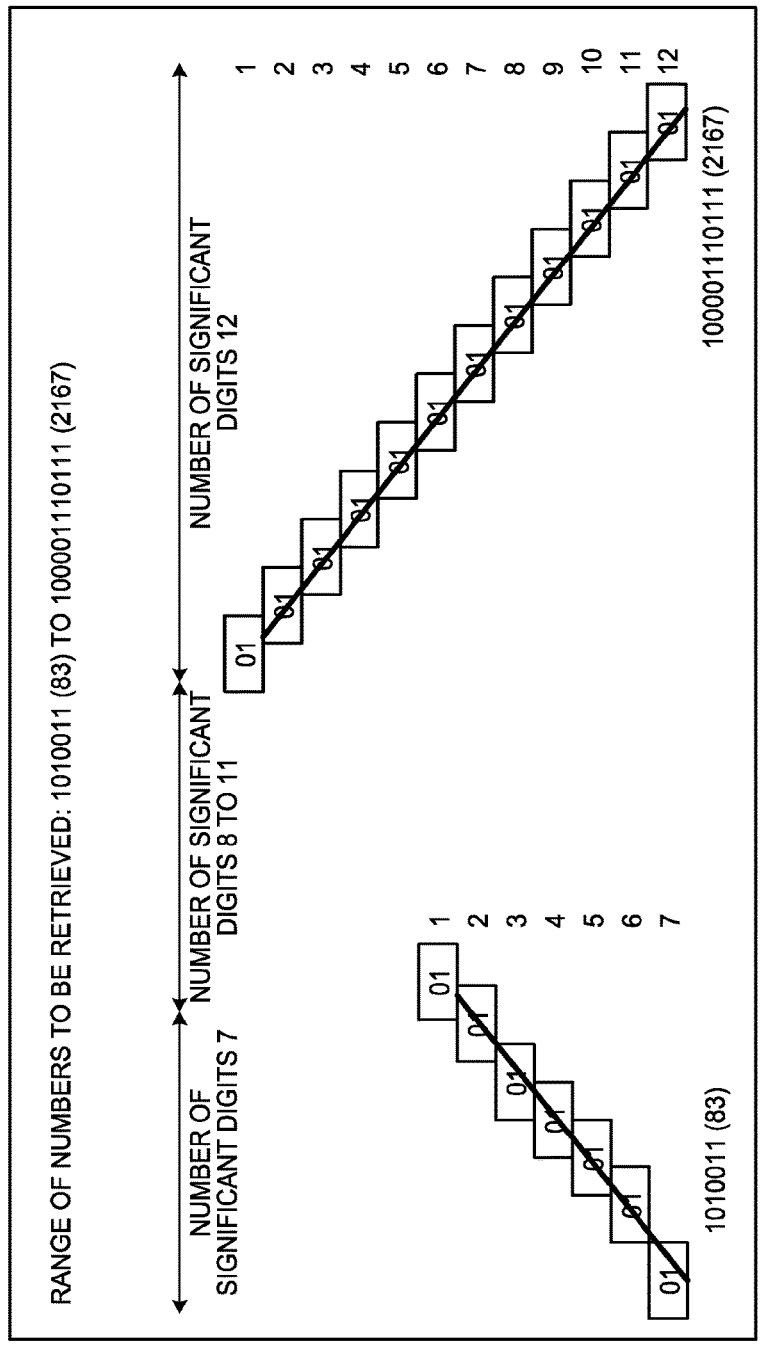
FIG. 15 is a schematic illustrating an example of a range retrieving process according to the second embodiment.

FIG. 15 is a schematic illustrating an example of a range retrieving process according to the second embodiment. As illustrated in FIG. 15, the retrieving apparatus 200 receives a condition for retrieving a range of numbers, and divides the received condition for retrieving the range into conditions in units of the number of significant digits.

For example, it is assumed that the range to be retrieved specified in the condition of the number range retrieval is "1010011 to 100001110111". "1010011" at the lower bound is a binary number with seven significant digits. "100001110111" at the upper bound is a binary number with 12 significant digits. The retrieving apparatus 200 then divides the condition specifying the range to be retrieved into a retrieval range condition having 7 as the number of significant digits, a retrieval range condition having 8 to 11 as the numbers of significant digits, and a retrieval range condition having 12 as the number of significant digits.

Figure 16A:
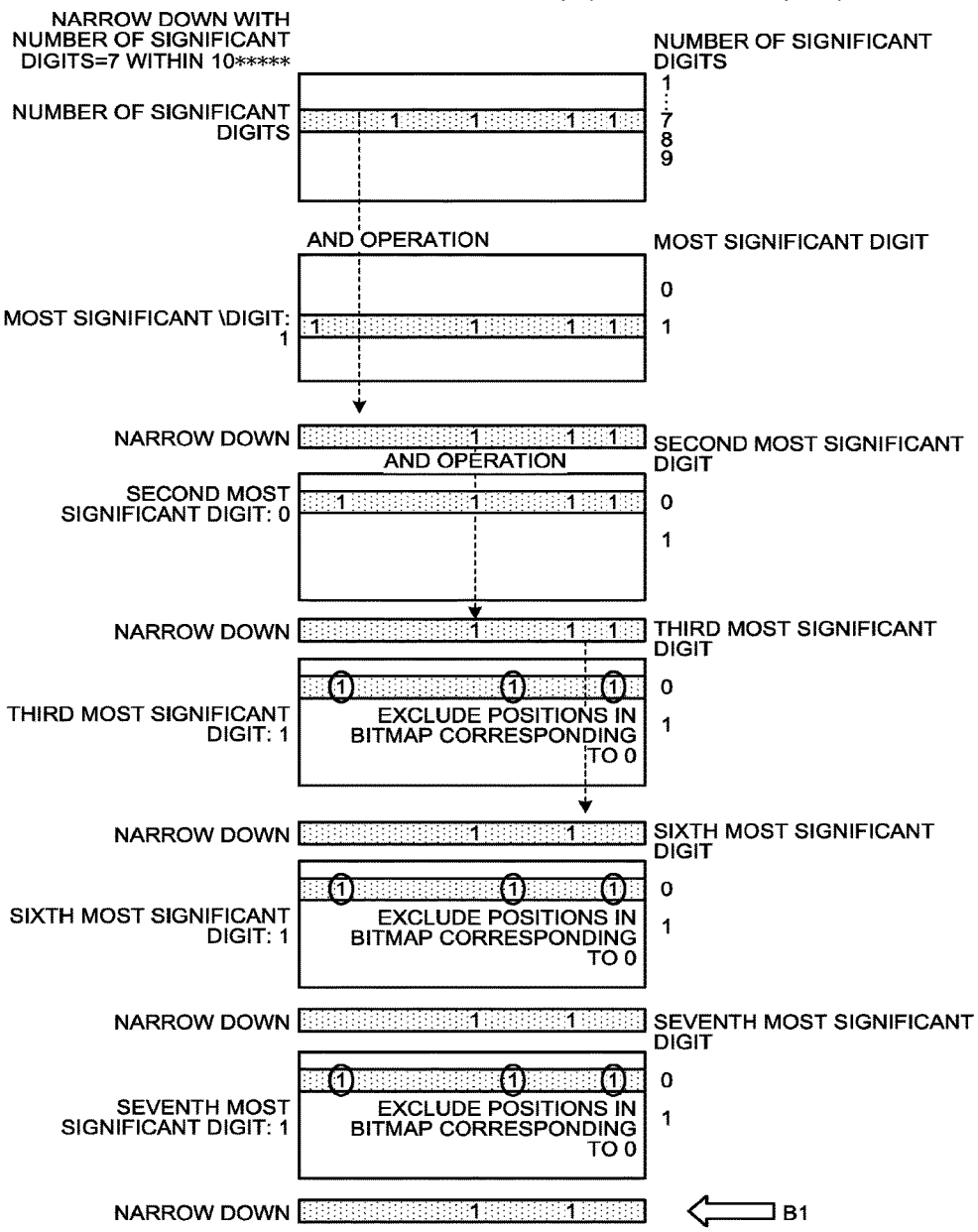
FIG. 16A is a first schematic illustrating an example of the sequence of the range retrieving process according to the second embodiment.
Figure 16B:
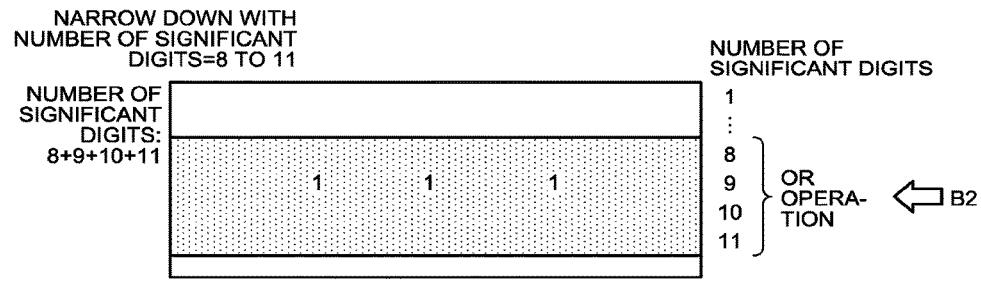
FIG. 16B is a second schematic illustrating an example of the sequence of the range retrieving process according to the second embodiment.
Figure 16C:
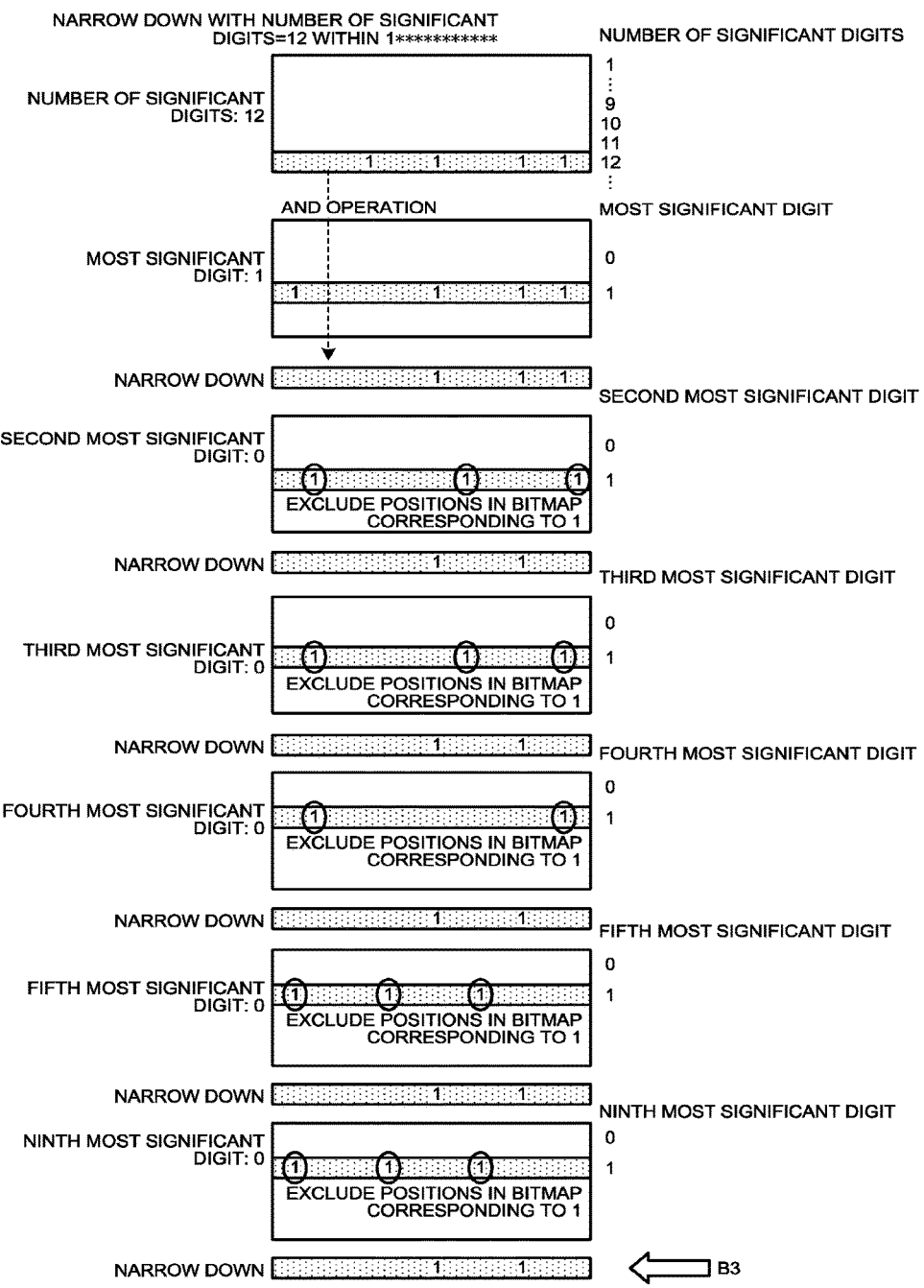
FIG. 16C is a third schematic illustrating an example of the sequence of the range retrieving process according to the second embodiment.

FIGS. 16A to 16C are schematics illustrating an example of the sequence of the range retrieving process according to the second embodiment. In FIGS. 16A to 16C, it is assumed that the range to be retrieved specified in the condition of the number range retrieval is "1010011 to 100001110111". FIG. 16A is a schematic for explaining the process of retrieving a range with a condition "10***", among the conditions having 7 as the number of significant digits. FIG. 16B is a schematic for explaining the process of retrieving a range with a condition having 8 to 11 as the number of significant digits. FIG. 16C is a schematic for explaining the process of retrieving a range with a condition "1*********", among the conditions having 12 as the number of significant digits.

As illustrated in FIG. 16A, the range retrieving process with the condition "10*****", among the conditions having 7 as the number of significant digits, is performed in the manner described below, for example. The retrieving apparatus 200 acquires "7" as the number of significant digits in the condition. For the lower-bound number, the retrieving apparatus 200 acquires "1" as the most significant digit, "0" as the second most significant digit, "1" as the third most significant digit, and "0" as the fourth most significant digit and the fifth most significant digit. For the lower-bound number, the retrieving apparatus 200 acquires "1" as the sixth most significant digit and the seventh most significant digit.

The retrieving apparatus 200 identifies "7" from a value range of the number of significant digits. The retrieving apparatus 200 acquires the bitmap corresponding to the identified number of significant digits, which is "7", from the bitmap index BI2. As a result, the retrieving apparatus 200 can narrow down the results to those matching the number of significant digits "7".

The retrieving apparatus 200 identifies the most significant digit "1" from a value range of the most significant digit. The retrieving apparatus 200 acquires the bitmap corresponding to the identified most significant digit, which is "1", from the bitmap index BI2. The retrieving apparatus then performs an AND operation of the results having been immediately previously narrowed down with the number of significant digits "7", and the results having been just narrowed down with the most significant digit "1". As a result, the retrieving apparatus 200 can narrow down the results to those matching the number of significant digits "7", and matching the most significant digit "1".

The retrieving apparatus 200 identifies the second most significant digit "0" from a value range of the second most significant digit. The retrieving apparatus 200 acquires the bitmap corresponding to the identified second most significant digit, which is "0", from the bitmap index BI2. The retrieving apparatus 200 then performs an AND operation of the results having been immediately previously narrowed down with the most significant digit "1", and the results having been just narrowed down with the second most significant digit "0". As a result, the retrieving apparatus 200 can narrow down the results to those matching the number of significant digits "7", matching the most significant digit "1", and matching the second most significant digit "0".

The retrieving apparatus 200 identifies the third most significant digit "1" from a value range of the third most significant digit. Because the identified digit is "1", the retrieving apparatus 200 acquires the bitmap having "0" as the third most significant digit from the bitmap index BI2. The retrieving apparatus 200 then excludes the positions at which the appeared bit appears, from the bitmap corresponding to the third most significant digit "0", among the results having been immediately previously narrowed down with the second most significant digit. This exclusion is intended to exclude the positions having "0", which is smaller than "1", as the third most significant digit, in which the lower-bound number of the range retrieval has the digit "1".

The retrieving apparatus 200 identifies the sixth most significant digit "1" from the value range of the sixth most significant digit. Because the identified digit is "1", the retrieving apparatus 200 acquires the bitmap corresponding to the sixth most significant digit "0" from the bitmap index BI2. The retrieving apparatus 200 then excludes the positions at which the appeared bit appears, from the bitmap corresponding to the sixth most significant digit "0", from the results having been immediately previously narrowed down. This exclusion is intended to exclude the positions having "0", which is smaller than "1", as the sixth most significant digit, in which the lower-bound number of the range retrieval has the digit "1".

The retrieving apparatus 200 then identifies the seventh most significant digit "1", from a value range of the seventh most significant digit. Because the identified digit is "1", the retrieving apparatus 200 acquires the bitmap corresponding to the seventh most significant digit "0" from the bitmap index BI2. The retrieving apparatus 200 then excludes the positions at which the appeared bit appears, from the bitmap corresponding to the seventh most significant digit "0", from the results having been immediately previously narrowed down. This exclusion is intended to exclude the positions having "0", which is smaller than "1", in the seventh most significant digit in which the number at the lower bound of the range to be retrieved has the digit "1". As a result, the retrieving apparatus 200 can narrow down the results to those matching the condition of "10*****", from the conditions specified with 7 as the number of significant digits. The results having been narrowed down are herein denoted as B1.

As illustrated in FIG. 16B, the range retrieving process with a condition specified with 8 to 11 as the number of significant digits is performed in the manner described below, for example. The retrieving apparatus 200 acquires "8" to "11", as the number of significant digits in the numbers within the retrieval range. The retrieving apparatus 200 identifies the numbers of significant digits "8" to "11" from the value range of the number of significant digits. The retrieving apparatus 200 then acquires the bitmaps corresponding to the identified numbers of significant digits, which are "8" to "11", from the bitmap index BI2. The retrieving apparatus 200 performs an OR operation of the bitmaps corresponding to the acquired numbers of significant digits "8" to "11". As a result, the retrieving apparatus 200 can narrow down the results to those matching the numbers of significant digits "8" to "11". The results having been narrowed down are herein denoted as B2.

As illustrated in FIG. 16C, the process of retrieving a range "1***********" with a condition specified with 12 as the number of significant digits is performed in the manner described below, for example. The retrieving apparatus 200 acquires "12" as the number of significant digits specified in the condition. For the upper-bound number, the retrieving apparatus 200 acquires "1" as the most significant digit, "0" as the second to the fifth most significant digits, "1" as the sixth to the eighth most significant digits, and "0" as the ninth most significant digit. For the upper-bound number, the retrieving apparatus 200 acquires "1" as the 10th to the 12th most significant digits.

The retrieving apparatus 200 identifies the number of significant digits "12", from the value range of the number of significant digits. The retrieving apparatus 200 acquires the bitmap corresponding to the identified number of significant digits, which is "12", from the bitmap index BI2. As a result, the retrieving apparatus 200 can narrow down the results to those matching the number of significant digits "12".

The retrieving apparatus 200 identifies the most significant digit "1", from the value range of the most significant digit. The retrieving apparatus 200 acquires the bitmap corresponding to the identified most significant digit, which is "1", from the bitmap index BI2. The retrieving apparatus then performs an AND operation of the results having been immediately previously narrowed down with the number of significant digits "12", and the results having been just narrowed down with the most significant digit "1". As a result, the retrieving apparatus 200 can narrow down the results to those matching the number of significant digits "12", and matching the most significant digit "1".

The retrieving apparatus 200 identifies the second most significant digit "0", from a value range of the second most significant digit. Because the identified digit is "0", the retrieving apparatus 200 acquires the bitmap corresponding to the digit "1" other than the digit identified in the identified second most significant place, which is "1", from the bitmap index B12. The retrieving apparatus 200 then excludes the positions at which the appeared bit appears in the bitmap corresponding to the second most significant digit "1", from the results having been immediately previously narrowed down with the most significant digit. This exclusion is intended to exclude the positions having "1", which is larger than "0", as the second most significant digit, in which the number at the upper bound of the range has the digit "0".

The retrieving apparatus 200 identifies the third most significant digit "0", from a value range of the third most significant digit. Because the identified digit is "0", the retrieving apparatus 200 acquires the bitmap corresponding to the digit other than the digit identified in the identified third most significant place, which is "1", from the bitmap index BI2. The retrieving apparatus 200 then excludes the positions at which the appeared bit appears in the bitmap corresponding to "1" in the third most significant digit, from the results having been immediately previously narrowed down. This exclusion is intended to exclude the positions having the digit "1", which is larger than "0", in the third most significant digit, in which the number at the upper bound of the retrieval range has the digit "0".

The retrieving apparatus 200 identifies the fourth most significant digit "0", from a value range of the fourth most significant digit. Because the identified digit is "0", the retrieving apparatus 200 acquires the bitmap corresponding to the digit other than the digit identified in the identified fourth most significant place, which is "1", from the bitmap index BI2. The retrieving apparatus 200 then excludes the positions at which the appeared bit appears in the bitmap corresponding to the fourth most significant digit "1", from the results having been immediately previously narrowed down. This exclusion is intended to exclude the positions having "1", which is larger than "0", as the fourth most significant digit, in which the number at the upper bound of the retrieval range has the digit "0".

The retrieving apparatus 200 identifies the fifth most significant digit "0", from a value range of the fifth most significant digit. Because the identified digit is "0", the retrieving apparatus 200 acquires the bitmap corresponding to the digit other than the digit identified in the identified fifth most significant place, which is "1", from the bitmap index BI2. The retrieving apparatus 200 then excludes the positions at which the appeared bit appears, in the bitmap corresponding to the fifth most significant digit "1", from the results having been immediately previously narrowed down. This exclusion is intended to exclude the positions having "1", which is larger than "0", as the fifth most significant digit, in which the number at the upper bound of the retrieval range has the digit "0".

The retrieving apparatus 200 identifies the ninth most significant digit "0", from a value range of the ninth most significant digit. Because the identified digit is "0", the retrieving apparatus 200 acquires the bitmap corresponding to the digit other than the digit identified in the identified ninth most significant place, which is "1", from the bitmap index BI2. The retrieving apparatus 200 then excludes the positions at which the appeared bit appears, in the bitmap corresponding to the ninth most significant digit "1", from the results having been immediately previously narrowed down. This exclusion is intended to exclude the positions having "1", which is larger than "0", as the ninth most significant digit, in which the number at the upper bound of the retrieval range has the digit "0". As a result, the retrieving apparatus 200 can narrow down the positions to those matching the condition "1***********", having 12 as the number significant digits. The results having been narrowed down are herein denoted as B3.

The retrieving apparatus 200 then takes a logical sum of the entire results having been narrowed down. In other words, the retrieving apparatus 200 performs an OR operation of the results having been narrowed down with the condition specified with 7 as the number of significant digits, the results having been narrowed down with the condition specified with 8 to 11 as the number of significant digits, and the results having been narrowed down with the condition specified with 12 as the number of significant digits. The result of this operation represents the retrieval result when the range to be retrieved is "1010011 to 100001110111".

In this manner, with a range retrieval, the retrieving apparatus 200 retrieves the position at which the numbers appear, using the bitmap corresponding to the digit in each place of the numbers to be retrieved. As a result, the retrieving apparatus 200 can speed up retrieval of a range of numbers by retrieving the numbers within the range without making a reference to the text data F2 that is the actual data.

Advantageous Effects Achieved by Second Embodiment

According to the second embodiment described above, the index generating apparatus 100 acquires the values corresponding to a plurality of respective attributes of a number that appears in the target text data F1, from the number. The index generating apparatus 100 then maps the values corresponding to the respective attributes to a plurality of respective value ranges of the respective attributes. The index generating apparatus 100 then generates the bitmap index 121 of bitmaps in which the position at which the number appears is mapped to each of a plurality of value ranges, including those to which the values are mapped. With such a configuration, the index generating apparatus 100 can generate the bitmap index 121 with which a number can be retrieved without making any entity reference, while suppressing an increase in size even when the number is a binary number.

Furthermore, according to the second embodiment described above, the retrieving apparatus 200 receives a predetermined condition for retrieving a number, and converts the received condition for retrieving the number into conditions corresponding to a plurality of value ranges of a plurality of respective attributes of the number. The retrieving apparatus 200 then retrieves the conditions resulted from the conversion, using the bitmap index 221. With such a configuration, the retrieving apparatus 200 can speed up a number retrieval by retrieving a number using the bitmap index 221, without making an entity reference, even when the number is a binary number.

Other Modifications of Embodiments

Some modifications of the embodiments described above will now be explained. Without limitation to the modifications described herein, the design may be changed as appropriate, within the scope not deviating from the scope of the present invention.

Explained in the first and the second embodiments is an example in which the index generating apparatus 100 generates the bitmap index BI, BI2 in which the position at which a number appears in the text data F1, F2 is mapped to a set of value ranges of a plurality of respective attributes of the number. Explained herein is an example in which the number of significant digits and the digit in each place of the number are used as the attributes of the number, but the attributes of numbers are not limited thereto, and symbols indicating − and + may also be added. Furthermore, when the number is a fraction, the attributes of the number may be a plurality of attributes representing the fraction. For example, when the number is a floating-point fraction, a symbol, a significand, a cardinal number, and an exponent may be used as the attributes of the number.

Furthermore, explained in the embodiments is an example in which the range of values of each attribute is defined at an equal interval in the bitmap index BI, B12. The range of values of each attribute may also be defined at unequal intervals, without limitation to the equal interval. For example, the range of values of each attribute may be set based on the values of the corresponding attribute used in the conditions for the past number retrievals in the text data F1 or F2, as recorded in the history of number retrievals. As an example, when the number is a decimal number, the value range of the digit in each place may be 0, 1, 2, m (3 to 7), 8, and 9, or 0, m (1 to 8), and 9.

The sequence of each process, the control procedure, the specific names, and information including various types of data and parameters explained in the embodiments may be changed in any way, unless specified otherwise.

Hardware Configuration

Figure 17:
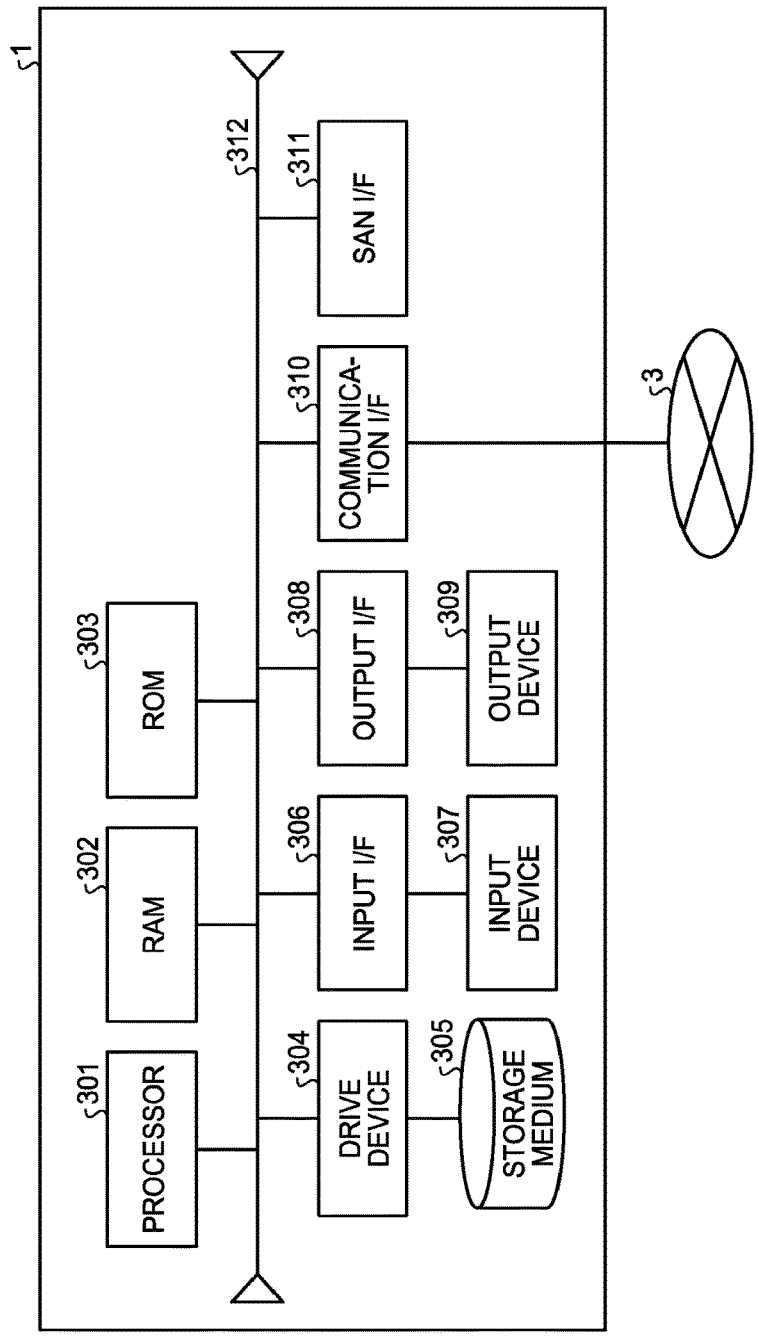
FIG. 17 is a schematic illustrating an exemplary hardware configuration of a computer.

Hardware and software used in the embodiments described above will now be explained. FIG. 17 is a schematic illustrating an exemplary hardware configuration of a computer 1. The computer 1 includes, for example, a processor 301, a random access memory (RAM) 302, a read-only memory (ROM) 303, a drive device 304, a storage medium 305, an input interface (I/F) 306, an input device 307, an output I/F 308, an output device 309, a communication I/F 310, a storage area network (SAN) I/F 311, and a bus 312. These pieces of hardware are connected to one another over the bus 312.

The RAM 302 is a memory device to and from which information can be written and read, and may be a semiconductor memory such as a static RAM (SRAM) or a dynamic RAM (DRAM), or a flash memory may be used instead of a RAM. An example of the ROM 303 includes a programmable ROM (PROM). The drive device 304 is a device performing at least one of reading information stored in and writing information to the storage medium 305. The storage medium 305 stores therein information written by the drive device 304. The storage medium 305 is a storage medium such as a hard disk, a flash memory such as a solid state drive (SSD), a compact disc (CD), a digital versatile disc (DVD), or a Blu-ray disk. The computer 1 is provided with a drive device 304 and a storage medium 305, for each of a plurality of types of storage medium, for example.

The input interface 306 is a circuit that is connected to the input device 307, and that communicates the input signals received from the input device 307 to the processor 301. The output interface 308 is a circuit that is connected to the output device 309, and that causes the output device 309 to make an output based on an instruction from the processor 301. The communication interface 310 is a circuit that controls the communication over a network 3. An example of the communication interface 310 is a network interface card (NIC). The SAN interface 311 is a circuit that controls the communication with a storage device connected to the computer 1 over a SAN. Examples of the SAN interface 311 include a host bus adapter (HBA).

The input device 307 is a device that transmits an input signal in response to an operation. Examples of the input signal include a key device such as a keyboard or a button provided to the main body of the computer 1, and a pointing device such as a mouse or a touch panel. The output device 309 is a device that outputs information under the control of the computer 1. Examples of the output device 309 include an image output device (display device) such as a display, and a sound output device such as a speaker. An input-output apparatus such as a touch screen may also be used as the input device 307 and the output device 309. The input device 307 and the output device 309 may be integrated with the computer 1, or may be devices that are connected externally to the computer 1, without being included in the computer 1, for example.

For example, the processor 301 reads a computer program stored in the ROM 303 or the storage medium 305 onto the RAM 302, and performs the process of the control unit 110, 210 in accordance with the read computer program. During the process, the RAM 302 is used as a working area for the processor 301. The function of the storage unit 120, 220 is implemented by causing the ROM 303 and the storage medium 305 to store computer-program files (an application program 24, a middleware 23, and an operating system (OS) 22 which will be described later), and data files (such as the bitmap index 121, 221), and causing the RAM 302 to be used as a working area for the processor 301. The computer programs read by the processor 301 will now be explained with reference to FIG. 18.

Figure 18:
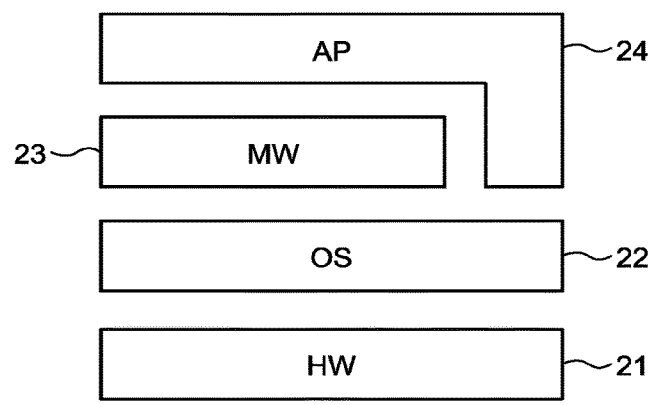
FIG. 18 is a schematic illustrating an exemplary configuration of computer programs to be operated on the computer.

FIG. 18 is a schematic illustrating an exemplary configuration of the computer programs to be executed on the computer. The OS 22 controlling a set of pieces of hardware (HW) 21 (301 to 311) illustrated in FIG. 18 is executed on the computer 1. By causing the processor 301 to operate in accordance with the procedure specified in the OS 22 to control and to manage the HW 21, the processes that are based on an application program (AP) 24 and a middleware (MW) 23 are executed on the HW 21. Furthermore, the MW 23 or the AP 24 is read onto the RAM 302 on the computer 1, and executed by the processor 301.

When the index generating function are called, the processor 301 implements the function of the control unit 110 by executing a process based on at least a part of the MW 23 or the AP 24 (by executing the process by controlling the HW 21 based on the OS 22). When the retrieval function is called, the processor 301 implements the function of the control unit 210 by causing the processor 301 to execute a process based on at least a part of the MW 23 or the AP 24 (by executing the process by controlling the HW 21 based on the OS 22). The index generating function and the retrieval function may be included in the AP 24, or may be a part of the MW 23 that is executed by being called by the AP 24.

Figure 19:
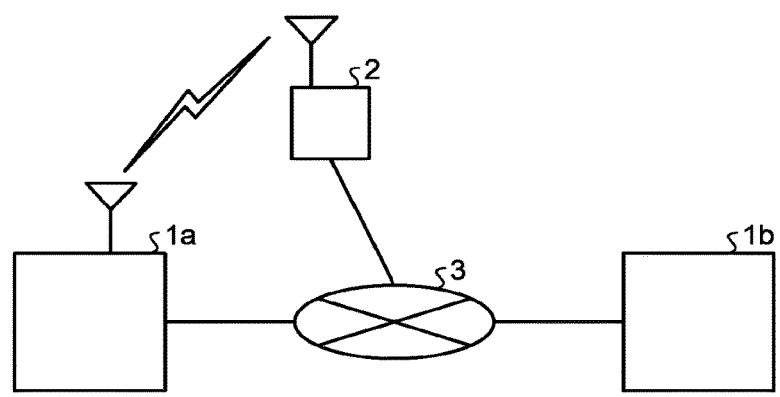
FIG. 19 is a schematic illustrating an exemplary configuration of devices included in a system according to the embodiments.

FIG. 19 is a schematic illustrating an exemplary configuration of devices included in a system according to the embodiments. The system illustrated in FIG. 19 includes a computer 1a, a computer 1b, a base station 2, and a network 3. The computer 1a is connected to the network 3 that is connected to the computer 1b, either wirelessly or over the wire.

The index generating apparatus 100 and the retrieving apparatus 200 may be included in any one of the computer 1a and the computer 1b, illustrated in FIG. 19. The computer 1b may include the function of the index generating apparatus 100, and the computer 1a may include the function of the retrieving apparatus 200.

Alternatively, the computer 1a may include the function of the index generating apparatus 100, and the computer 1b may include the function of the retrieving apparatus 200. Furthermore, both of the computer 1a and the computer 1b may be provided with the function of the index generating apparatus 100 and the function of the retrieving apparatus 200.

According to one embodiment, index information with which a number can be retrieved without making any entity reference can be generated, while suppressing an increase in size.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a retrieving process comprising:
   receiving a predetermined condition for retrieving a number;
   converting the received condition for retrieving the number into conditions corresponding to a plurality of value ranges of a plurality of respective attributes of the number; and
   retrieving the converted conditions using index information indicating bitmap data in which a position at which the number appears is mapped to each of the value ranges of the respective attributes.

2. The non-transitory computer-readable recording medium according to claim 1, further comprising dividing, when the predetermined condition for retrieving the number is a condition specifying a range of numbers, the condition specifying the range of numbers into conditions in units of number of significant digits, wherein
   the converting and the retrieving are performed for each of the divided conditions.

3. The non-transitory computer-readable recording medium according to claim 1, wherein the retrieving includes returning a result of the retrieving the number by making a reference only to the index information.

4. The non-transitory computer-readable recording medium according to claim 1, wherein the attributes are number of significant digits and a digit in each place.

5. A retrieving apparatus comprising:
   a processor;
   a memory, wherein the processor executes a process comprising:
   receiving a predetermined condition for retrieving a number;
   converting the received condition for retrieving the number into conditions corresponding to a plurality of value ranges of a plurality of respective attributes of the number; and
   retrieving the converted conditions resultant using index information indicating bitmap data in which a position at which the number appears is mapped to each of the value ranges of the respective attributes.

6. A retrieving method to be executed by a computer, the method comprising:
   receiving a predetermined condition for retrieving a number using a processor;
   converting the received condition for retrieving the number into conditions corresponding to a plurality of value ranges of a plurality of respective attributes of the number using the processor; and
   retrieving the converted conditions using index information indicating bitmap data in which a position at which the number appears is mapped to each of the value ranges of the respective attributes using the processor.

* * * * *